(12) United States Patent
Morooka

(10) Patent No.: US 9,791,677 B2
(45) Date of Patent: Oct. 17, 2017

(54) INNER FOCUS MACROLENS AND IMAGE PICKUP DEVICE USING THE SAME

(71) Applicant: OLYMPUS CORPORATION, Tokyo (JP)

(72) Inventor: Masaru Morooka, Akishima (JP)

(73) Assignee: OLYMPUS CORPORATION, Tokyo (JP)

( * ) Notice: Subject to any disclaimer, the term of this patent is extended or adjusted under 35 U.S.C. 154(b) by 164 days.

(21) Appl. No.: 14/943,550

(22) Filed: Nov. 17, 2015

(65) Prior Publication Data

US 2016/0139386 A1     May 19, 2016

(30) Foreign Application Priority Data

Nov. 18, 2014   (JP) .................................. 2014-233321

(51) Int. Cl.
*G02B 15/22*        (2006.01)
*G02B 13/24*        (2006.01)

(52) U.S. Cl.
CPC .................................. *G02B 13/24* (2013.01)

(58) Field of Classification Search
CPC ................................................... G02B 13/24
USPC ........................................ 359/684, 693, 705
See application file for complete search history.

(56) References Cited

U.S. PATENT DOCUMENTS

| 8,605,363 B2 | 12/2013 | Sakai et al. |
| 8,810,931 B2 | 8/2014 | Sunaga et al. |
| 2010/0053766 A1* | 3/2010 | Okada .................. G02B 15/177 359/686 |
| 2012/0194924 A1 | 8/2012 | Sakai et al. |
| 2013/0033768 A1 | 2/2013 | Sunaga et al. |

FOREIGN PATENT DOCUMENTS

| JP | 2012-159613 A | 8/2012 |
| JP | 2012-220654 | 11/2012 |
| JP | 2012-242472 | 12/2012 |
| JP | 2013-37080 | 2/2013 |
| JP | 2014-21341 | 2/2014 |

* cited by examiner

*Primary Examiner* — Bumsuk Won
*Assistant Examiner* — Collin X Beatty
(74) *Attorney, Agent, or Firm* — Scully, Scott, Murphy & Presser, P.C.

(57) ABSTRACT

This disclosure is directed to an inner focus macrolens. The inner focus macrolens can include sequentially from an object side, a first lens unit, an aperture stop, a second lens unit having a positive refractive power, a third lens unit having a negative refractive power and a fourth lens unit having a positive refractive power, wherein the first lens unit comprises a negative lens as the closest powered lens to the object side and a positive lens, the second lens unit comprises an object side negative lens as the closest powered lens to the object side and a positive lens, the third lens unit comprises a negative lens, and the fourth lens unit comprises a positive lens.

17 Claims, 16 Drawing Sheets

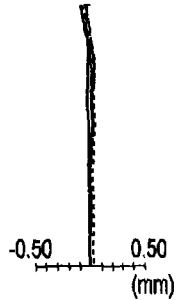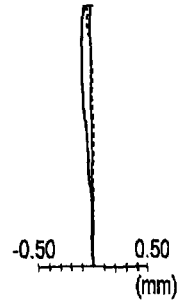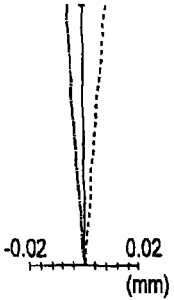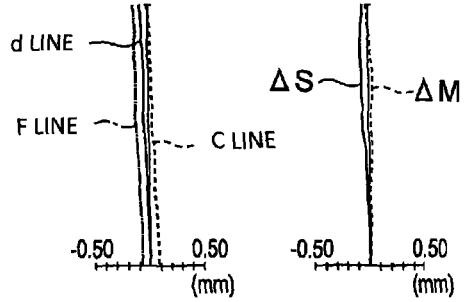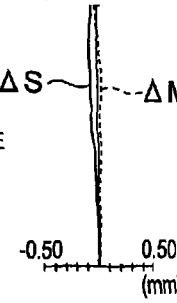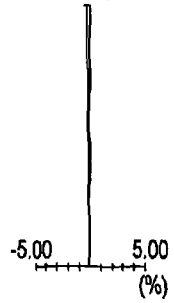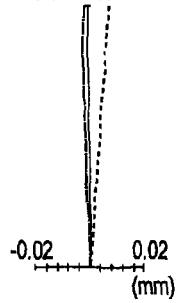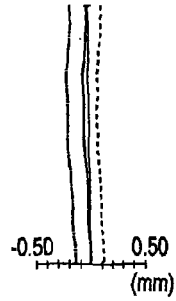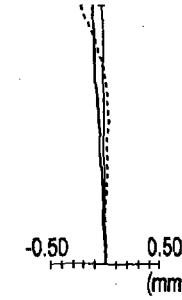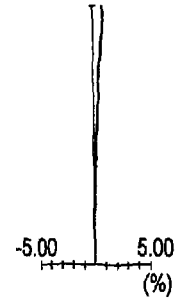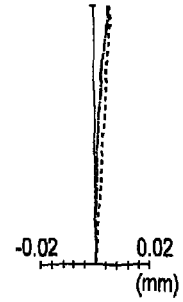

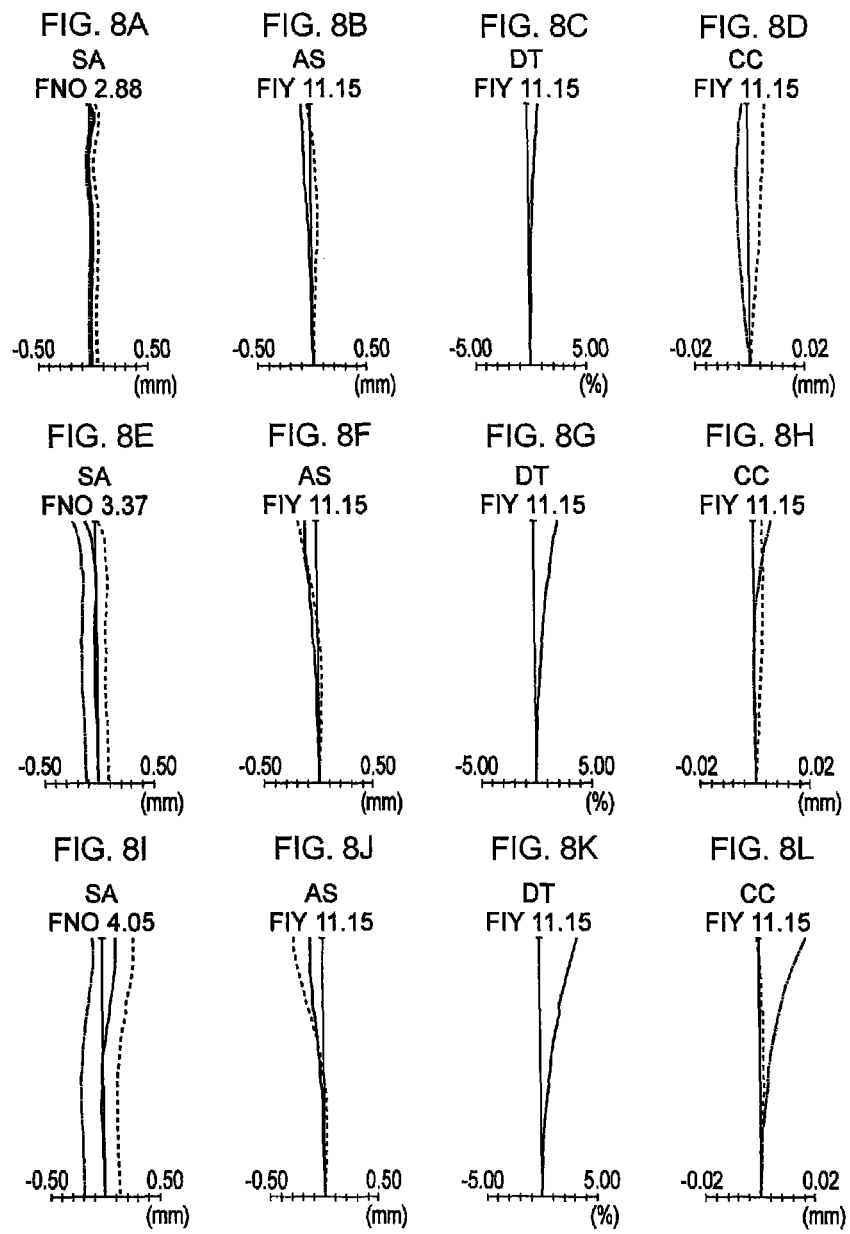

SA
FNO 2.88

AS
FIY 11.15

DT
FIY 11.15

CC
FIY 11.15

SA
FNO 3.33

AS
FIY 11.15

DT
FIY 11.15

CC
FIY 11.15

SA
FNO 4.06

AS
FIY 11.15

DT
FIY 11.15

CC
FIY 11.15

SA
FNO 2.88
-0.50  0.50
(mm)

AS
FIY 11.45
-0.50  0.50
(mm)

DT
FIY 11.45
-5.00  5.00
(%)

CC
FIY 11.45
-0.02  0.02
(mm)

SA
FNO 3.27
-0.50  0.50
(mm)

AS
FIY 11.45
-0.50  0.50
(mm)

DT
FIY 11.45
-5.00  5.00
(%)

CC
FIY 11.45
-0.02  0.02
(mm)

SA
FNO 4.05
-0.50  0.50
(mm)

AS
FIY 11.45
-0.50  0.50
(mm)

DT
FIY 11.45
-5.00  5.00
(%)

CC
FIY 11.45
-0.02  0.02
(mm)

SA
FNO 3.56

-0.50    0.50
   (mm)

AS
FIY 11.45

-0.50    0.50
   (mm)

DT
FIY 11.45

-5.00    5.00
   (%)

CC
FIY 11.45

-0.02    0.02
   (mm)

SA
FNO 4.09

-0.50    0.50
   (mm)

AS
FIY 11.45

-0.50    0.50
   (mm)

DT
FIY 11.45

-5.00    5.00
   (%)

CC
FIY 11.45

-0.02    0.02
   (mm)

SA
FNO 5.05

-0.50    0.50
   (mm)

AS
FIY 11.45

-0.50    0.50
   (mm)

DT
FIY 11.45

-5.00    5.00
   (%)

CC
FIY 11.45

-0.02    0.02
   (mm)

SA
FNO 3.56

-0.50  0.50
(mm)

AS
FIY 11.45

-0.50  0.50
(mm)

DT
FIY 11.45

-5.00  5.00
(%)

CC
FIY 11.45

-0.02  0.02
(mm)

SA
FNO 4.07

-0.50  0.50
(mm)

AS
FIY 11.45

-0.50  0.50
(mm)

DT
FIY 11.45

-5.00  5.00
(%)

CC
FIY 11.45

-0.02  0.02
(mm)

SA
FNO 5.04

-0.50  0.50
(mm)

AS
FIY 11.45

-0.50  0.50
(mm)

DT
FIY 11.45

-5.00  5.00
(%)

CC
FIY 11.45

-0.02  0.02
(mm)

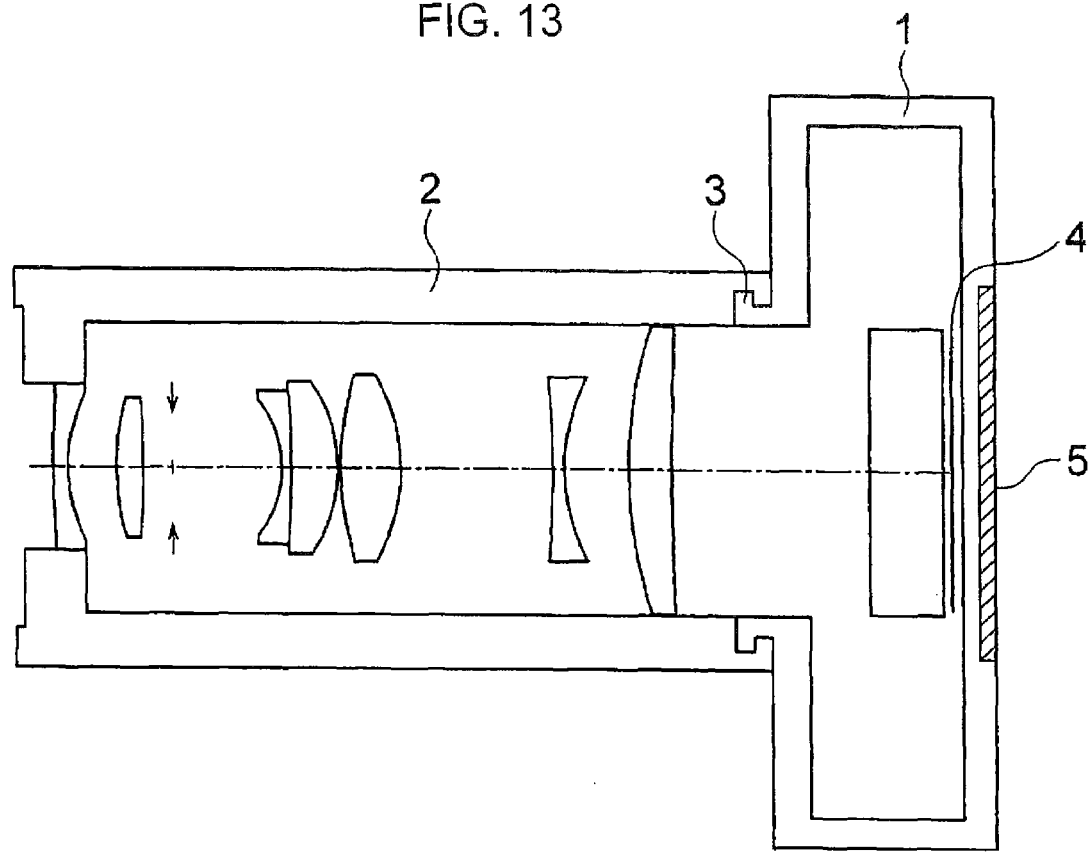

INNER FOCUS MACROLENS AND IMAGE PICKUP DEVICE USING THE SAME

CROSS-REFERENCE TO RELATED APPLICATION

The present application is based upon and claims the benefit of priority from the prior Japanese Patent Application No. 2014-233321 filed on Nov. 18, 2014; the entire contents of which are incorporated herein by reference.

BACKGROUND OF THE INVENTION

Field of the Invention

The present invention relates to an image lens, and particularly to an inner focus macrolens suitable as an image lens of a camera, and an image pickup device using such a lens.

Description of the Related Art

Lenses used in photographic cameras and still video cameras include wide-angle lenses and standard lenses. As such wide-angle lenses or standard lenses, Gauss lenses have been conventionally proposed. In a Gauss lens, refractive powers are substantially symmetrically disposed with respect to an aperture stop.

Wide-angle lenses and standard lenses generally have focusing functions. Examples of the focus type include an inner focus type. Gauss lenses can also employ the inner focus type. In this case, some of the lenses disposed closer to an image than an aperture stop is move.

In the inner focus type, a lens to be moved is a relatively light-weight lens. In the case of moving a plurality of lenses, a relatively small number of lenses move. Thus, the inner focus type is advantageous because of its increased focusing speed and reduced cost.

SUMMARY OF THE INVENTION

An inner focus macrolens according to the present invention comprises sequentially from an object side:
a first lens unit;
an aperture stop;
a second lens unit having a positive refractive power;
a third lens unit having a negative refractive power; and
a fourth lens unit having a positive refractive power, wherein
the first lens unit comprises a negative lens as the closest powered lens to the object side and a positive lens,
the second lens unit comprises an object side negative lens as the closest powered lens to the object side and a positive lens,
the third lens unit comprises a negative lens,
the fourth lens unit comprises a positive lens,
wherein focusing is performed by moving the third lens unit toward an image side, and
the inner focus macrolens satisfies conditional expressions (1) and (2):

$$-5 \leq (1-\beta_3^2) \times \beta_4^2 \leq -2 \quad (1)$$

$$-4 \leq (R_{2f}+R_{2r})/(R_{2f}-R_{2r}) \leq 0.4 \quad (2)$$

wherein
$\beta_3$ is a lateral magnification of the third lens unit in focusing on an infinity object,
$\beta_4$ is a lateral magnification of the fourth lens unit in focusing on the infinity object,
$R_{2f}$ is a radius of curvature of an object side surface of the object side negative lens, and
$R_{2r}$ is a radius of curvature of an image side surface of the object side negative lens.

BRIEF DESCRIPTION OF THE DRAWINGS

FIG. 1A illustrates the case of focusing on an infinity object, FIG. 1B illustrates the case of focusing on a first short-distance object, and FIG. 1C illustrates the case of focusing on a second short-distance object.

FIG. 2A illustrates the case of focusing on an infinity object, FIG. 2B illustrates the case of focusing on a first short-distance object, and FIG. 2C illustrates the case of focusing on a second short-distance object.

FIG. 3A illustrates the case of focusing on an infinity object, FIG. 3B illustrates the case of focusing on a first short-distance object, and FIG. 3C illustrates the case of focusing on a second short-distance object.

FIG. 4A illustrates the case of focusing on an infinity object, FIG. 4B illustrates the case of focusing on a first short-distance object, and FIG. 4C illustrates the case of focusing on a second short-distance object.

FIG. 5A illustrates the case of focusing on an infinity object, FIG. 5B illustrates the case of focusing on a first short-distance object, and FIG. 5C illustrates the case of focusing on a second short-distance object.

FIG. 6A illustrates the case of focusing on an infinity object, FIG. 6B illustrates the case of focusing on a first short-distance object, and FIG. 6C illustrates the case of focusing on a second short-distance object.

FIG. 7A, FIG. 7B, FIG. 7C, FIG. 7D, FIG. 7E, FIG. 7F, FIG. 7G, FIG. 7H, FIG. 7I, FIG. 7J, FIG. 7K, and FIG. 7L show aberrations in the cases of focusing on an infinity object, a first short-distance object, and a second short-distance object in Example 1.

FIG. 8A, FIG. 8B, FIG. 8C, FIG. 8D, FIG. 8E, FIG. 8F, FIG. 8G, FIG. 8H, FIG. 8I, FIG. 8J, FIG. 8K, and FIG. 8L show aberrations in the cases of focusing on an infinity object, a first short-distance object, and a second short-distance object in Example 2.

FIG. 13 is a cross sectional view of an image pickup device.

DETAILED DESCRIPTION OF THE INVENTION

Figure 1A:
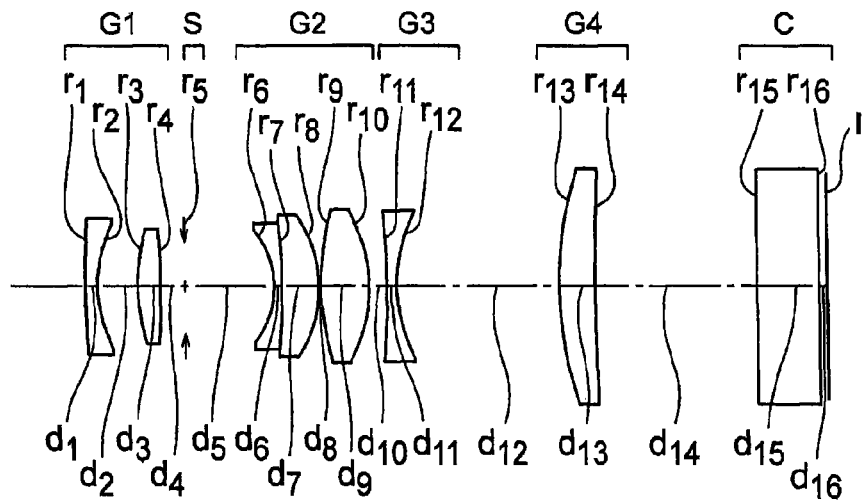
FIG. 1A, FIG. 1B, and FIG. 1C show lens cross sectional views of an inner focus macrolens according to Example 1, where

Prior to description of examples, advantages of an embodiment in an aspect of the present invention will be described. Advantages of the embodiment will be described using specific illustrations. However, similarly to the cases of examples below, the illustrated aspect is merely part of aspects included in the present invention, and there are a large number of variations of the aspect. Thus, the present invention is not limited to the illustrated aspect.

An inner focus macrolens according to the present embodiment includes sequentially from an object side: a first lens unit; an aperture stop; a second lens unit having a positive refractive power; a third lens unit having a negative refractive power; and a fourth lens unit having a positive refractive power. The first lens unit includes at least a negative lens closest to the object side and a positive lens. The second lens unit includes at least an object side negative lens closest to the object side and a positive lens. The third lens unit includes at least a negative lens. The fourth lens unit includes at least a positive lens. Focusing is performed by moving the third lens unit toward an image side. The inner focus macrolens satisfies conditional expressions (1) and (2):

$$-5 \leq (1-\beta_3^2) \times \beta_4^2 \leq -2 \quad (1)$$

$$-4 \leq (R_{2f}+R_{2r})/(R_{2f}-R_{2r}) \leq 0.4 \quad (2)$$

where $\beta_3$ is a lateral magnification of the third lens unit in focusing on an infinity object, $\beta_4$ is a lateral magnification of the fourth lens unit in focusing on the infinity object, $R_{2f}$ is a radius of curvature of an object side surface of the object side negative lens, and $R_{2r}$ is a radius of curvature of an image side surface of the object side negative lens.

The inner focus macrolens according to the present embodiment includes sequentially from an object side: the first lens unit; the aperture stop; the second lens unit having the positive refractive power; the third lens unit having the negative refractive power; and the fourth lens unit having the positive refractive power.

In the inner focus macrolens according to the present embodiment, main aberration correction is performed by the first lens unit and the second lens unit. Thus, the first lens unit includes at least one negative lens and at least one positive lens, and the second lens unit also includes at least one negative lens and at least one positive lens. In this manner, the first lens unit and the second lens unit bear large proportions of aberration correction.

In the first lens unit, the negative lens is disposed closest to the object side. In the second lens unit, the negative lens (hereinafter referred to as an "object side negative lens") is disposed closest to the object side.

Since the first lens unit includes the negative lens and the positive lens, spherical aberration and astigmatism can be improved. In addition, since the negative lens is disposed closest to the object side, the optical system has a wide angle of view, and a suitable back focus is obtained.

Since the second lens unit includes the negative lens and the positive lens, spherical aberration and chromatic aberration can be improved. In addition, since the object side negative lens is disposed closest to the object side, the optical system of the second lens unit serves as an optical system of a retro focus. In this manner, a principal point of the second lens unit can be disposed close to an image side. Consequently, a sufficient back focus is obtained. In addition, the height of the off-axis rays can be reduced at a side closer to the image side than the second lens unit.

The third lens unit has negative refractive power. Since the third lens unit has the negative refractive power, a sufficient back focus can be obtained.

In addition, as described above, since main aberration correction is performed by the first lens unit and the second lens unit, the proportion of a load of the aberration correction on the third lens unit can be reduced. In this manner, the configuration of the third lens unit can be simplified. That is, the third lens unit can be composed of at least one negative lens.

The third lens unit can move during focusing. In this manner, the third lens unit functions as a focus lens unit. As described above, since the configuration of the third lens unit can be simplified, the weight of the focus lens unit can be reduced. In focusing from the infinity object to the short-distance object, the third lens unit can move toward the image side.

The first lens unit and the second lens unit can improve main aberration, and in addition, the height of the off-axis ray is lower in the image side than in the second lens unit. Thus, even when the third lens unit moves, an aberration variation during focusing can be reduced.

The fourth lens unit has the positive refractive power. Thus, a Petzval sum and chromatic aberration can be improved.

The fourth lens unit includes at least one positive lens. In the case where the photographing magnification in photographing the short-distance object is increased, an aberration variation due to focusing by the third lens unit can increase. In particular, in focusing on the short-distance object, spherical aberration and curvature of field can vary significantly.

To reduce the variations of the spherical aberration and the curvature of field the refractive power of the third lens unit is reduced to some degree. The reduction of the refractive power of the third lens unit, however, can increase the amount of movement of the third lens unit in focusing from the infinity object onto the short-distance object as well as cause the third lens unit to pass through a portion with high off-axis rays. Thus, the lens diameter can increase. Furthermore, the back focus also can increase, resulting in difficulty in size reduction of the optical system.

As described above, the third lens unit has negative refractive power so as to obtain a suitable back focus. In view of this, in the inner focus macrolens according to the present embodiment, the fourth lens unit having the positive refractive power is disposed at the image side of the third lens unit. In this manner, the fourth lens unit can be used for adjusting the photographing magnification in focusing on the short-distance object, thereby obtaining a high photographing magnification without a decrease in the refractive power of the third lens unit.

As a result, the amount of movement of the third lens unit during focusing can be reduced with size reduction of the optical system, and at the same time, the photographing magnification in focusing on the short-distance object can be increased.

The inner focus macrolens according to the present embodiment satisfies conditional expressions (1) and (2):

$$-5 \leq (1-\beta_3^2) \times \beta_4^2 \leq -2 \quad (1)$$

$$-4 \leq (R_{2f}+R_{2r})/(R_{2f}-R_{2r}) \leq 0.4 \quad (2)$$

wherein $\beta_3$ is a lateral magnification of the third lens unit in focusing on an infinity object, $\beta_4$ is a lateral magnification of the fourth lens unit in focusing on the infinity object, $R_{2f}$ is a radius of curvature of an object side surface of the object side negative lens, and $R_{2r}$ is a radius of curvature of an image side surface of the object side negative lens.

By satisfying conditional expression (1), the refractive powers of the third lens unit and the fourth lens unit are enhanced with the lens movement sensitivity of the third lens unit during focusing being adjusted. As a result, both size reduction and high productivity of the optical system are achieved with good image formation performance being maintained.

Above the lower limit of conditional expression (1), the lens movement sensitivity of the third lens unit in focusing on the short-distance object does not increase much. In this case, since the lateral magnification of the third lens unit does not increase much, the refractive power of the third lens unit does not increase much, either. As a result, variations of spherical aberration and coma aberration in focusing on the short-distance object can be reduced. In addition, the sensitivity of the third lens unit to manufacturing errors (e.g., shift and tilt) does not increase much. Accordingly, decrease in productivity can be prevented. Above the lower limit of conditional expression (1), a variation of photographing magnification can be reduced.

Below the upper limit of conditional expression (1), the lens movement sensitivity of the third lens unit in focusing on the short-distance object does not decrease much. In this case, since the amount of movement of the third lens unit in focusing on the short-distance object does not increase, the size of the optical system can be reduced. In addition, since the lateral magnification of the third lens unit does not decrease, the refractive power of the third lens unit does not decrease much. In this case, since the Petzval sum of the third lens unit does not decrease much, curvature of field and chromatic aberration in the optical system can be improved.

The shape of the object side negative lens in the second lens unit can be suitably defined by satisfying conditional expression (2). As a result, coma aberration and curvature of field can be improved.

Above the lower limit of conditional expression (2), the refractive power of the object side negative lens does not decrease much. In this case, the Petzval sum of the second lens unit does not decrease much, the curvature of field in the optical system does not increase. The coma aberration can also be improved.

Below the upper limit of conditional expression (2), the radius of curvature of the object side surface of the object side negative lens does not increase much. Thus, the curvature of field and the coma aberration can be improved.

The inner focus macrolens according to the present embodiment can also satisfy conditional expression (3):

$$1.2 \leq f_1/f \leq 30 \quad (3)$$

wherein $f_1$ is a focal length of the first lens unit, and f is a focal length of the entire inner focus macrolens system on an infinity object.

The size reduction of the optical system and reduction of aberration variations in focusing on the short-distance object can be achieved by satisfying conditional expression (3).

Above the lower limit of conditional expression (3), the refractive power of the first lens unit does not increase much. In this case, the lateral magnification in an optical system subsequent to the second lens unit does not relatively increase, and thus, aberration occurring in the first lens unit is less likely to expand in the optical system subsequent to the second lens unit. As a result, aberration variations, especially variations of the curvature of field and the coma aberration, during focusing on the short-distance object do not increase.

Below the upper limit of conditional expression (3), the refractive power of the first lens unit does not decrease much. In this case, the height of the axial rays incident on the second lens unit does not increase, and thus, the lens diameter in the second lens unit does not increase. As a result, the size of the optical system can be reduced.

The inner focus macrolens according to the present embodiment can satisfy conditional expression (4):

$$1.2 \leq f_4/f \leq 2 \quad (4)$$

wherein $f_4$ is a focal length of the fourth lens unit, and f is a focal length of the entire inner focus macrolens system in focusing on the infinity object.

Even with reduction of the total length of the optical system, aberration of the optical system can be improved by satisfying conditional expression (4).

Above the lower limit of conditional expression (4), the refractive power of the fourth lens unit does not decrease much. Thus, the total length of the optical system can be reduced.

Below the upper limit of conditional expression (4), the refractive power of the fourth lens unit does not increase much. In this case, neither significant spherical aberration nor significant chromatic aberration occurs in the optical system, and thus, these aberrations can be improved.

The inner focus macrolens according to the present embodiment can satisfy conditional expression (5):

$$0.2 \leq f_2/f \leq 1.0 \quad (5)$$

wherein $f_2$ is a focal length of the second lens unit, and f is a focal length of the entire inner focus macrolens system in focusing on the infinity object.

The inner focus macrolens according to the present embodiment can satisfy conditional expression (6):

$$-3.0 \leq f_3/f \leq -0.1 \quad (6)$$

wherein $f_3$ is a focal length of the third lens unit, and f is a focal length of the entire inner focus macrolens system in focusing on the infinity object.

The refractive power of the third lens unit can be suitably set, and the sensitivity of the third lens unit to manufacturing errors can be reduced, by satisfying conditional expression (6).

The inner focus macrolens according to the present embodiment can satisfy conditional expression (7):

$$0.40 \leq f_{12}/f \leq 0.80 \quad (7)$$

wherein $f_{12}$ is a composite focal length of the first lens unit and the second lens unit in focusing on the infinity object, and f is a focal length of the entire inner focus macrolens system on the infinity object.

Composite refractive power of the first lens unit and the second lens unit can be suitably set by satisfying conditional expression (7).

Above the lower limit of conditional expression (7), an increase in the lateral magnification of a composite optical system including the third lens unit and the fourth lens unit can be reduced, thereby reducing the number of lenses in each of the third lens unit and the fourth lens unit.

Below the upper limit of conditional expression (7), the back focus can be suitably set. Thus, the size of the optical system can be reduced.

The inner focus macrolens according to the present embodiment can satisfy conditional expression (8):

$$0.10 \leq D_{23}/TL \leq 0.30 \quad (8)$$

wherein $D_{23}$ is the amount of movement of the third lens unit, and

TL is a total length of the inner focus macrolens.

Here, the amount of movement of the third lens unit is the difference between the location of the third lens unit in focusing on the infinity object and the location of the third lens unit in focusing on an object at a photographing magnification of −1.0. The total length of the inner focus macrolens is a paraxial distance from the object side surface of a lens closest to an object side in the first lens unit in focusing on the infinity object to the image pickup plane.

The inner focus macrolens according to the present embodiment can satisfy conditional expression (9):

$$0.03 \leq D_3/D_{23} \leq 0.20 \quad (9)$$

wherein $D_3$ is the thickness of the third lens unit, and $D_{23}$ is the maximum amount of movement of the third lens unit.

Here, the thickness of the third lens unit is a paraxial distance from an object side surface of a lens closest to the object side in the third lens unit to an image side surface of a lens closest to the image side in the third lens unit.

In the inner focus macrolens according to the present embodiment, the refractive power of the first lens unit can be a positive refractive power.

In this manner, the optical system including the first lens unit and the second lens unit can be of a Gauss type. As a result, the first lens unit and the second lens improve main aberration. Thus, the configuration of the third lens unit can be simplified, and aberration variations during focusing can be further reduced.

In the inner focus macrolens according to the present embodiment, the first lens unit can include sequentially from the object side: a negative lens; and a positive lens. Alternatively, the first lens unit can include sequentially from the object side: a negative lens; a positive lens; and a negative lens.

In the inner focus macrolens according to the present embodiment, the first lens unit can include sequentially from the object side: a negative lens having a concave surface facing the image side; and a biconvex positive lens.

In this manner, the first lens unit has a suitable refractive power. Since the image side surface of the lens closest to the object side in the first lens unit has the concave surface facing the image side, occurrence of aberration with respect to off-axis rays can be reduced.

In the inner focus macrolens according to the present embodiment, the first lens unit can include a biconcave negative lens and a biconvex positive lens.

In this manner, the first lens unit has a suitable refractive power. The biconcave negative lens can be disposed closer to the object side than the biconvex positive lens is. Then, since the image side surface of the lens closest to the object side in the first lens unit has the concave surface facing the image side, occurrence of aberration with respect to off-axis rays can be reduced. In addition, since the image side surface of the lens closest to the object side in the first lens unit has the concave surface facing the image side, the principal point is positioned at the object side. Thus, in focusing on a close-distance object, the distance between the optical system and the object can be increased.

In the inner focus macrolens according to the present embodiment, the second lens unit can include sequentially from the object side: a negative lens; a positive lens; and a positive lens.

To further reduce the size of the optical system, the refractive power of the second lens unit can be further increased. In the case where the second lens unit includes one negative lens and one positive lens, however, the refractive power of the positive lens with respect to the refractive power of the negative lens can be large. As a result, it can be difficult to improve the spherical aberration and the coma aberration, and in addition, decentration sensitivities of the negative lens and the positive lens can increase.

Thus, the second lens unit includes two positive lenses so that the positive refractive power of the second lens unit is shared by the two positive lenses. In this case, the refractive power of each of the positive lenses is smaller than that in the case where the second lens unit includes one positive lens. Thus, the refractive power of one positive lens with respect to the refractive power of one negative lens is small. As a result, the spherical aberration and the coma aberration can be improved, and decentration sensitivities of the negative lens and the positive lenses can be reduced.

In the inner focus macrolens according to the present embodiment, the second lens unit can include sequentially from the object side: a negative meniscus lens having a convex surface facing the image side; a positive meniscus lens having a convex surface facing the image side; and a biconvex positive lens. Thus, the second lens unit has an good refractive power.

In the inner focus macrolens according to the present embodiment, the third lens unit can include a negative lens having a concave surface facing the image side. Thus, the third lens unit has an good refractive power.

In the inner focus macrolens according to the present embodiment, the fourth lens unit is a positive single lens, and can be composed of one lens. The convex surface of the positive single lens can face the image side. Then, the fourth lens unit has an good refractive power.

In the inner focus macrolens according to the present embodiment, the fourth lens unit can be fixed (stops) during focusing.

In this manner, a higher photographing magnification can be obtained without reduction of the refractive power of the third lens unit.

An image pickup device according to the present embodiment can include: an inner focus macrolens; and an image pickup element having an image pickup plane and configured to convert an image formed on the image pickup plane by the inner focus macrolens into an electric signal, and the inner focus macrolens is the inner focus macrolens described above.

In this manner, it is possible to provide a compact image pickup device showing good image formation performance and a small variation of the photographing magnification during focusing.

One or more of the abovementioned arrangements can simultaneously be satisfied. For instance, an arrangement may be made such that one of the abovementioned inner focus macrolenses is used with one of the aforementioned inner focus macrolenses or the image pickup apparatus.

Regarding each conditional expression, at least one of the lower limit value and the upper limit value can be satisfied. For restricting the numerical range of a conditional expression, the upper limit value or the lower limit value of each conditional expression may be let to be an upper limit value or a lower limit value of an other conditional expression.

For conditional expression (1), the lower limit value can be between about −4.37 and about −3.73. Moreover, for conditional expression (1), the upper limit value can be between about −2.18 and about −2.36.

For conditional expression (2), the lower limit value can be between about −3.12 and about −2.24. Moreover, for conditional expression (2), the upper limit value can be between about −0.07 and about −0.54.

For conditional expression (3), the lower limit value can be between about 1.90 and about 2.59. Moreover, for conditional expression (3), the upper limit value can be between about 22.74 and about 10.64, such as for example, 15.48, 13.06 and all other values in between 22.74 and 10.64.

For conditional expression (4), the lower limit value can be between about 1.30 and about 1.39. Moreover, for conditional expression (4), the upper limit value can be between about 1.91 and about 1.83.

For conditional expression (5), the lower limit value can be between about 0.34 and about 0.49. Moreover, for conditional expression (5), the upper limit value can be between about 0.92 and about 0.84.

For conditional expression (6), the lower limit value can be between about −2.35 and about −1.69. Moreover, for conditional expression (6), the upper limit value can be between about −0.33 and about −0.57.

For conditional expression (7), the lower limit value can be between about 0.45 and about 0.50. Moreover, for conditional expression (7), the upper limit value can be between about 0.73 and about 0.66.

For conditional expression (8), the lower limit value can be between about 0.12 and about 0.13. Moreover, for conditional expression (8), the upper limit value can be between about 0.26 and about 0.23.

For conditional expression (9), the lower limit value can be between about 0.04 and about 0.06. Moreover, for conditional expression (9), the upper limit value can be between about 0.16 and about 0.13.

Examples of inner focus macrolenses according to certain aspects of the present invention will be described below in detail by referring to the accompanying diagrams. However, the present invention is not restricted to the examples described below.

Next, inner focus macrolenses according to examples from an example 1 to an example 6 will be described below. FIG. 1A to FIG. 6C are lens cross-sectional views, where, FIG. 1A, FIG. 2A, FIG. 3A, FIG. 4A, FIG. 5A, and FIG. 6A show lens cross-sectional views at the cases of focusing on an infinity object, FIG. 1B, FIG. 2B, FIG. 3B, FIG. 4B, FIG. 5B, and FIG. 6B show lens cross-sectional views at the cases of focusing on a first short-distance object, and FIG. 1C, FIG. 2C, FIG. 3C, FIG. 4C, FIG. 5C, and FIG. 6C show lens cross-sectional views at the cases of focusing on a second short-distance object. The case of focusing on the first short-distance denotes the case in focusing on an object at a photographing magnification of −0.5. The case of focusing on the second short-distance denotes the case in focusing on an object at a photographing magnification of −1.0.

Moreover, a first lens unit is denoted by G1, a second lens unit is denoted by G2, a third lens unit is denoted by G3, a fourth lens unit is denoted by G4, an aperture stop is denoted by S, and an image plane (image pickup surface) is denoted by I. A cover glass C of an electronic image pickup element may be disposed between the fourth lens unit G4 and the image plane I. A flat and parallel plate which forms a low-pass filter may be disposed. A wavelength region restricting coating which restricts infrared light may be applied to a surface of the flat and parallel plate. Moreover, a multilayer film for restricting wavelength region may be applied to a surface of the cover glass C. The cover glass C may be imparted an effect of a low-pass filter.

Figure 1B:
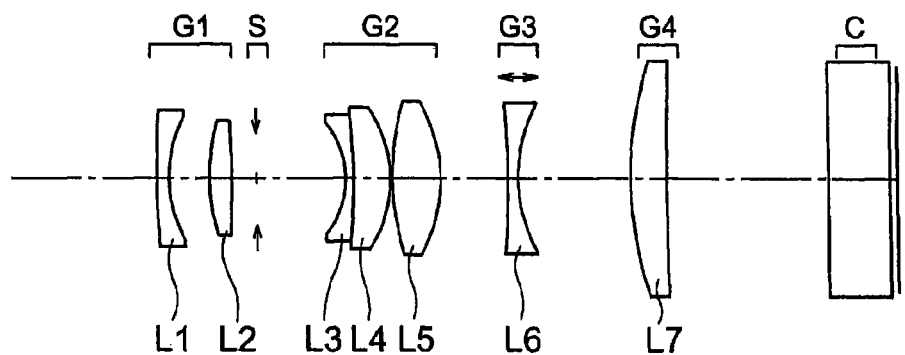
Figure 1C:
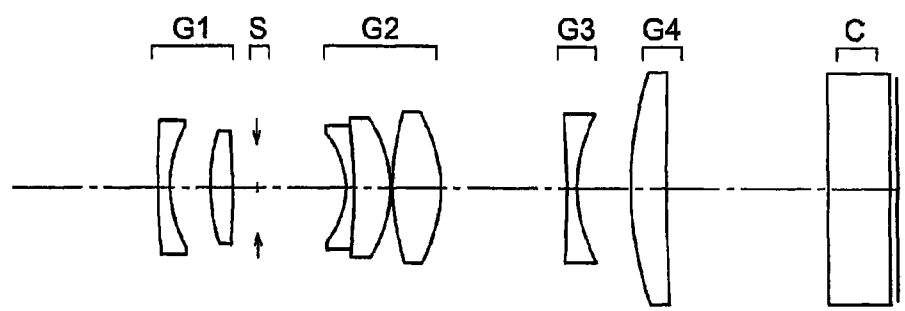

As shown in FIGS. 1A, 1B and 1C, Example 1 is directed to an inner focus macrolens including sequentially from an object side: a first lens unit G1 having positive refractive power; a second lens unit G2 having positive refractive power; a third lens unit G3 having negative refractive power, and a fourth lens unit G4 having positive refractive power. An aperture stop (stop) S is disposed between the first lens unit G1 and the second lens unit G2.

The first lens unit G1 includes a negative meniscus lens L1 having a convex surface facing the object side and a biconvex positive lens.

The second lens unit G2 includes a negative meniscus lens L3 having a convex surface facing the image side, a positive meniscus lens L4 having a convex surface facing the image side, and biconvex positive lens L5. Here, the negative meniscus lens L3 and the positive meniscus lens L4 are cemented The third lens unit G3 includes a biconcave negative lens L6.

The fourth lens unit G4 includes a positive meniscus lens L7 having a convex surface facing the object side.

In focusing from the infinity object to the short-distance object, the third lens unit G3 moves toward the image side, the first lens unit G1, the second lens unit G2, and the fourth lens unit G4 are fixed (stops).

An aspheric surface is provided to a total of six surfaces, both surfaces of the negative meniscus lens L1, both surfaces of the biconvex positive lens L5, and both surfaces of the biconcave negative lens L6.

Figure 2A:
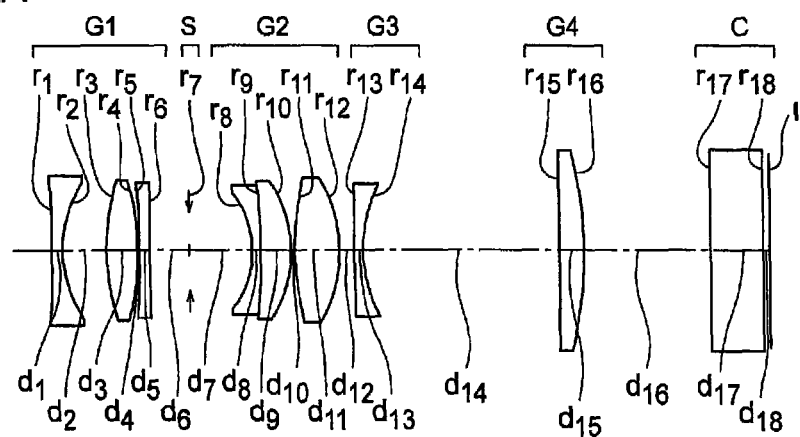
FIG. 2A, FIG. 2B, and FIG. 2C show lens cross sectional views of an inner focus macrolens according to Example 2, where
Figure 2B:
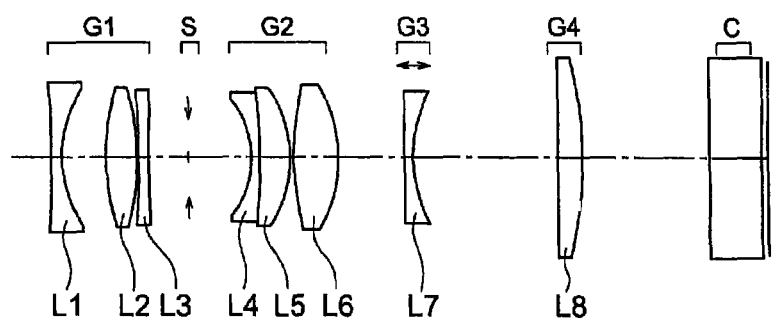
Figure 2C:
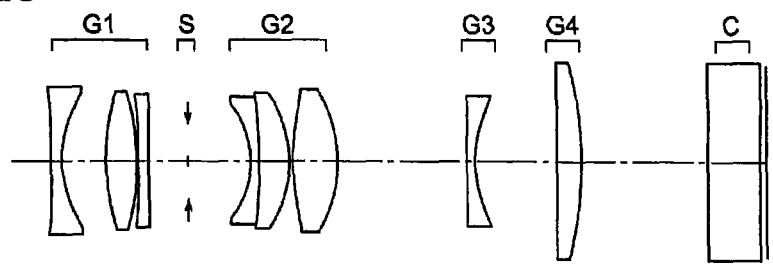

As shown in FIGS. 2A, 2B and 2C, Example 2 is directed to an inner focus macrolens including sequentially from an object side: a first lens unit G1 having positive refractive power; a second lens unit G2 having positive refractive power; a third lens unit G3 having negative refractive power, and a fourth lens unit G4 having positive refractive power.

An aperture stop (stop) S is disposed between the first lens unit G1 and the second lens unit G2.

The first lens unit G1 includes a biconcave negative lens L1, a biconvex positive lens L2, and a biconcave negative lens L3.

The second lens unit G2 includes a negative meniscus lens L4 having a convex surface facing the image side, a positive meniscus lens L5 having a convex surface facing the image side, and a biconvex positive lens L6. Here, the negative meniscus lens L4 and the positive meniscus lens L5 are cemented The third lens unit G3 includes a negative meniscus lens L7 having a convex surface facing the object side.

The fourth lens unit G4 includes a positive meniscus lens L8 having a convex surface facing the image side.

In focusing from the infinity object to the short-distance object, the third lens unit G3 moves toward the image side, the first lens unit G1, the second lens unit G2, and the fourth lens unit G4 are fixed (stops).

An aspheric surface is provided to a total of six surfaces, both surfaces of the biconcave negative lens L1, both surfaces of the biconvex positive lens L6, and both surfaces of the negative meniscus lens L7.

Figure 3A:
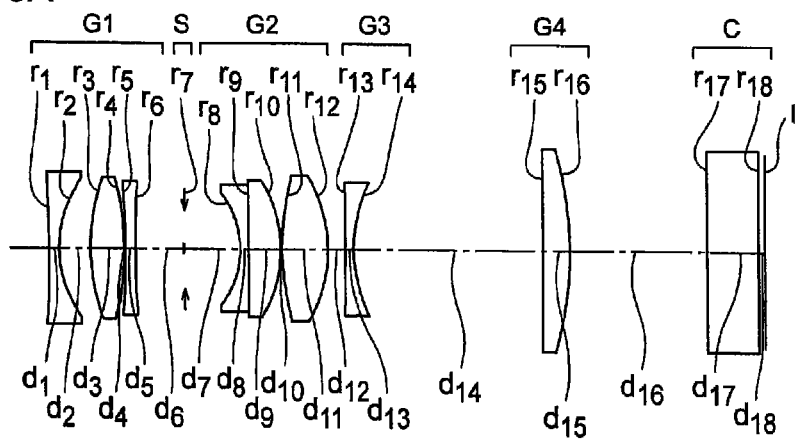
FIG. 3A, FIG. 3B, and FIG. 3C show lens cross sectional views of an inner focus macrolens according to Example 3, where
Figure 3B:
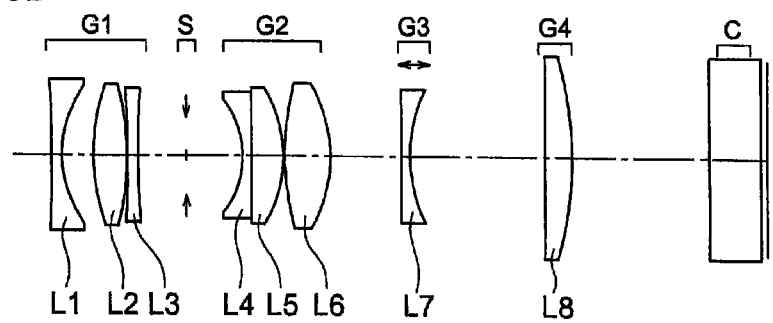
Figure 3C:
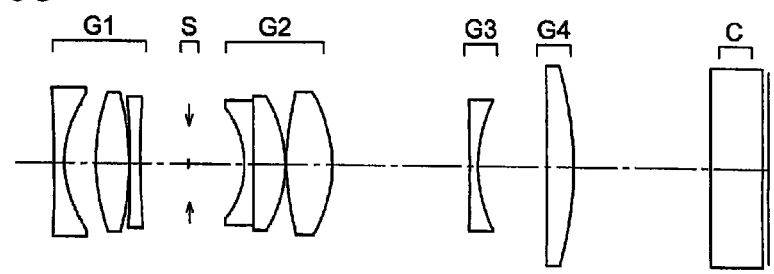

As shown in FIGS. 3A, 3B and 3C, Example 3 is directed to an inner focus macrolens including sequentially from an object side: a first lens unit G1 having positive refractive power; a second lens unit G2 having positive refractive power; a third lens unit G3 having negative refractive power, and a fourth lens unit G4 having positive refractive power. An aperture stop (stop) S is disposed between the first lens unit G1 and the second lens unit G2.

The first lens unit G1 includes a biconcave negative lens L1, a biconvex positive lens L2, and a biconcave negative lens L3.

The second lens unit G2 includes a negative meniscus lens L4 having a convex surface facing the image side, a positive meniscus lens L5 having a convex surface facing the image side, and a biconvex positive lens L6. Here, the negative meniscus lens L4 and the positive meniscus lens L5 are cemented The third lens unit G3 includes a negative meniscus lens L7 having a convex surface facing the object side.

The fourth lens unit G4 includes a positive meniscus lens L8 having a convex surface facing the image side.

In focusing from the infinity object to the short-distance object, the third lens unit G3 moves toward the image side, the first lens unit G1, the second lens unit G2, and the fourth lens unit G4 are fixed (stops).

An aspheric surface is provided to a total of six surfaces, both surfaces of the biconcave negative lens L1, both surfaces of the biconvex positive lens L6, and both surfaces of the negative meniscus lens L7.

Figure 4A:
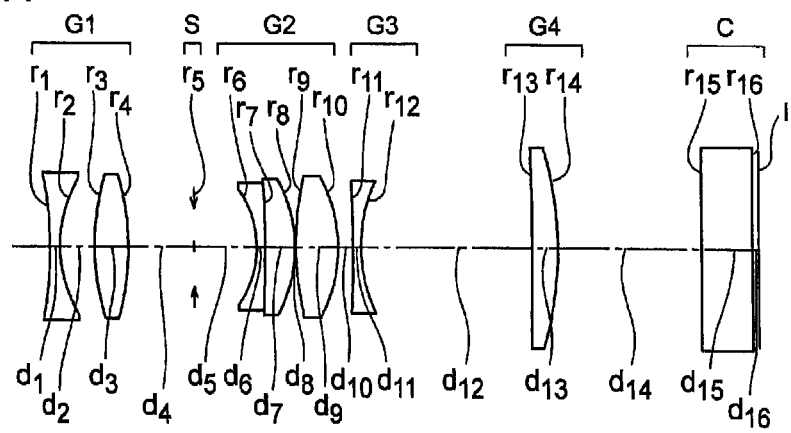
FIG. 4A, FIG. 4B, and FIG. 4C show lens cross sectional views of an inner focus macrolens according to Example 4, where
Figure 4B:
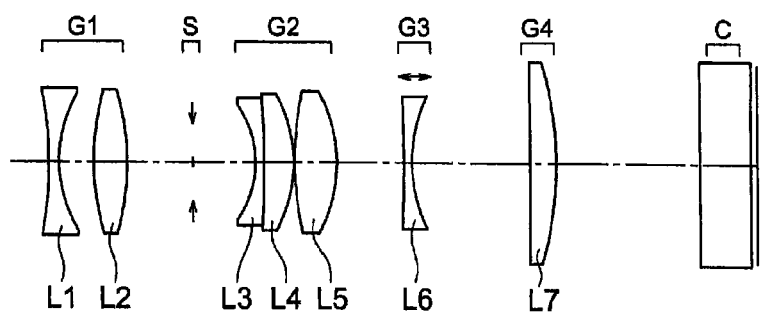
Figure 4C:
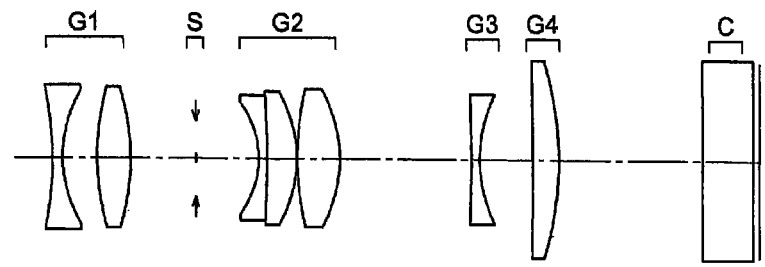

As shown in FIGS. 4A, 4B and 4C, Example 4 is directed to an inner focus macrolens including sequentially from an object side: a first lens unit G1 having positive refractive power; a second lens unit G2 having positive refractive power; a third lens unit G3 having negative refractive power, and a fourth lens unit G4 having positive refractive power. An aperture stop (stop) S is disposed between the first lens unit G1 and the second lens unit G2.

The first lens unit G1 includes a biconcave negative lens L1 and a biconvex positive lens L2.

The second lens unit G2 includes a negative meniscus lens L3 having a convex surface facing the image side, a positive meniscus lens L4 having a convex surface facing the image side, and a biconvex positive lens L5. Here, the negative meniscus lens L3 and the positive meniscus lens L4 are cemented The third lens unit G3 includes a biconcave negative lens L6.

The fourth lens unit G4 includes a positive meniscus lens L7 having a convex surface facing the image side.

In focusing from the infinity object to the short-distance object, the third lens unit G3 moves toward the image side, the first lens unit G1, the second lens unit G2, and the fourth lens unit G4 are fixed (stops).

An aspheric surface is provided to a total of six surfaces, both surfaces of the biconcave negative lens L1, both surfaces of the biconvex positive lens L5, and both surfaces of the biconcave negative lens L6.

Figure 5A:
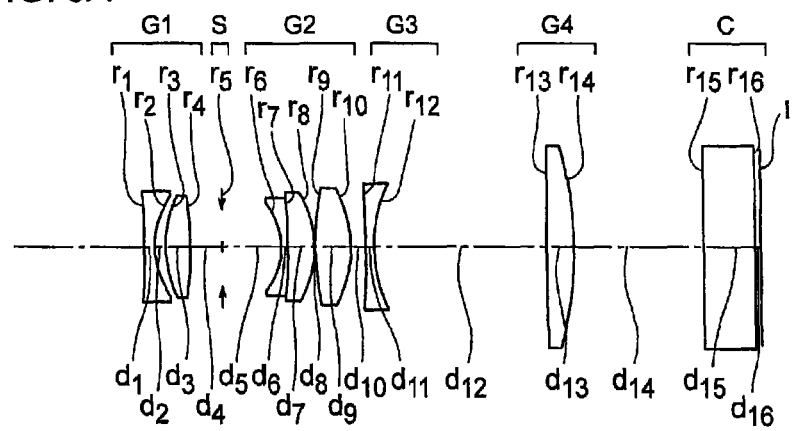
FIG. 5A, FIG. 5B, and FIG. 5C show lens cross sectional views of an inner focus macrolens according to Example 5, where
Figure 5B:
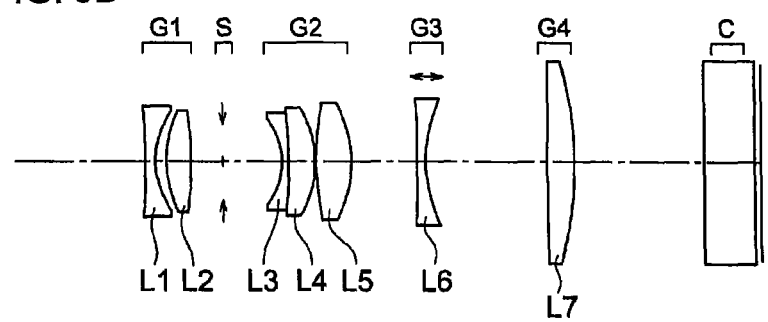
Figure 5C:
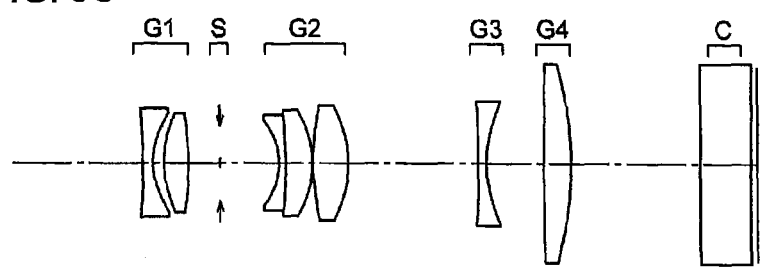

As shown in FIGS. 5A, 5B and 5C, Example 5 is directed to an inner focus macrolens including sequentially from an object side: a first lens unit G1 having positive refractive power; a second lens unit G2 having positive refractive power; a third lens unit G3 having negative refractive power, and a fourth lens unit G4 having positive refractive power. An aperture stop (stop) S is disposed between the first lens unit G1 and the second lens unit G2.

The first lens unit G1 includes a biconcave negative lens L1 and a biconvex positive lens L2.

The second lens unit G2 includes a negative meniscus lens L3 having a convex surface facing the image side, a positive meniscus lens L4 having a convex surface facing the image side, and a biconvex positive lens L5. Here, the negative meniscus lens L3 and the positive meniscus lens L4 are cemented The third lens unit G3 includes a biconcave negative lens L6.

The fourth lens unit G4 includes a biconvex positive lens L7.

In focusing from the infinity object to the short-distance object, the third lens unit G3 moves toward the image side, the first lens unit G1, the second lens unit G2, and the fourth lens unit G4 are fixed (stops).

An aspheric surface is provided to a total of six surfaces, both surfaces of the biconcave negative lens L1, both surfaces of the biconvex positive lens L5, and both surfaces of the biconcave negative lens L6.

Figure 6A:
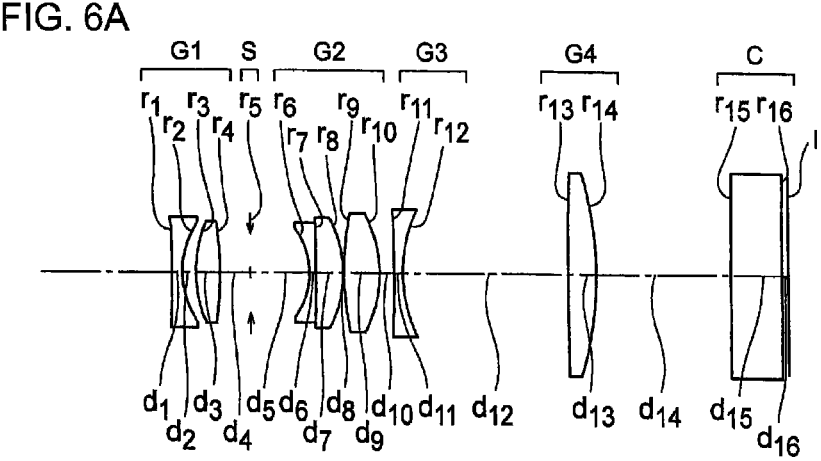
FIG. 6A, FIG. 6B, and FIG. 6C show lens cross sectional views of an inner focus macrolens according to Example 6, where
Figure 6B:
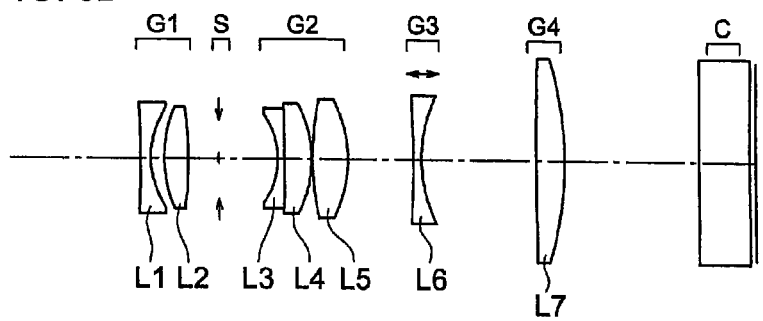
Figure 6C:
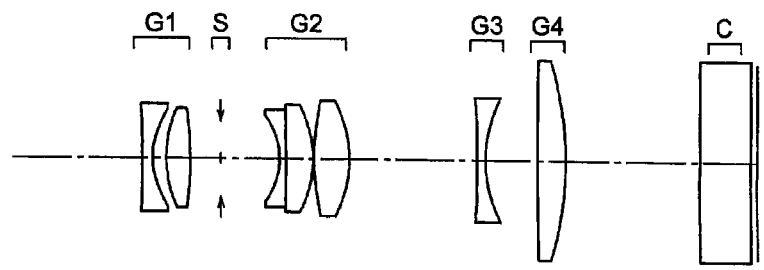
Figure 9A:
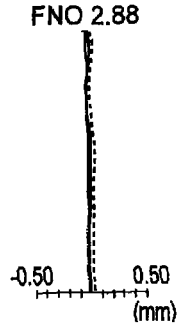
FIG. 9A, FIG. 9B, FIG. 9C, FIG. 9D, FIG. 9E, FIG. 9F, FIG. 9G, FIG. 9H, FIG. 9I, FIG. 9J, FIG. 9K, and FIG. 9L show aberrations in the cases of focusing on an infinity object, a first short-distance object, and a second short-distance object in Example 3.
Figure 9B:
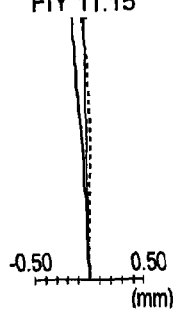
Figure 9C:
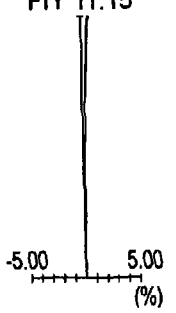
Figure 9D:
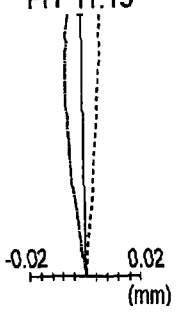
Figure 9E:
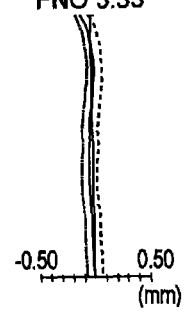
Figure 9F:
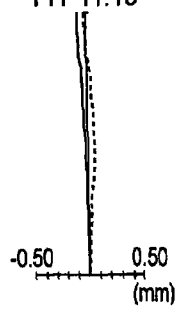
Figure 9G:
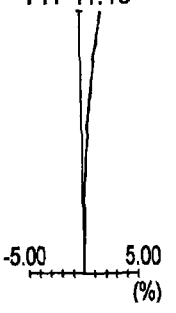
Figure 9H:
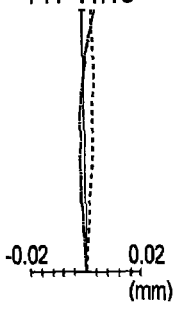
Figure 9I:
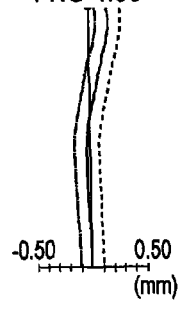
Figure 9J:
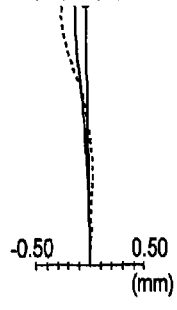
Figure 9K:
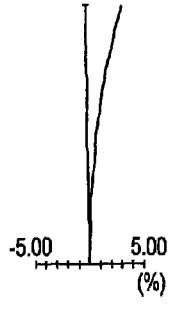
Figure 9L:
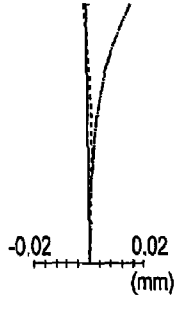
Figure 10A:
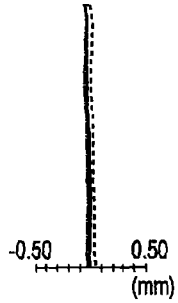
FIG. 10A, FIG. 10B, FIG. 10C, FIG. 10D, FIG. 10E, FIG. 10F, FIG. 10G, FIG. 10H, FIG. 10I, FIG. 10J, FIG. 10K, and FIG. 10L show aberrations in the cases of focusing on an infinity object, a first short-distance object, and a second short-distance object in Example 4.
Figure 10B:
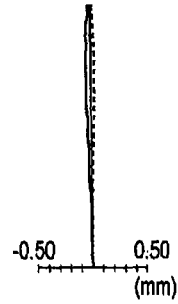
Figure 10C:
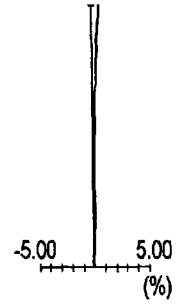
Figure 10D:
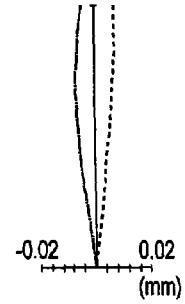
Figure 10E:
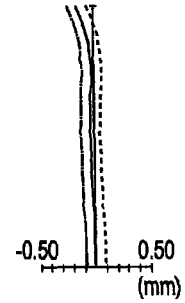
Figure 10F:
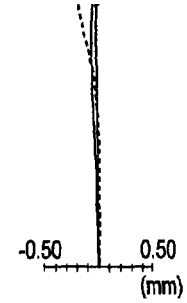
Figure 10G:
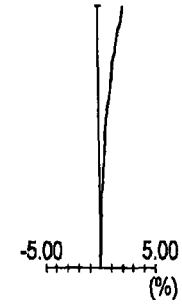
Figure 10H:
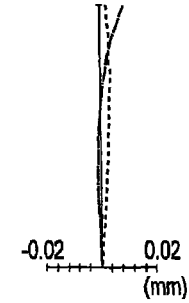
Figure 10I:
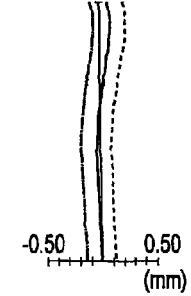
Figure 10J:
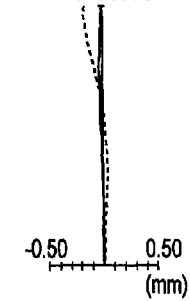
Figure 10K:
Figure 10L:
Figure 11A:
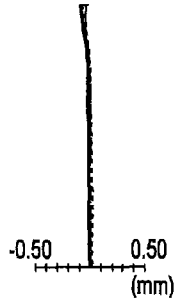
FIG. 11A, FIG. 11B, FIG. 11C, FIG. 11D, FIG. 11E, FIG. 11F, FIG. 11G, FIG. 11H, FIG. 11I, FIG. 11J, FIG. 11K, and FIG. 11L show aberrations in the cases of focusing on an infinity object, a first short-distance object, and a second short-distance object in Example 5.
Figure 11B:
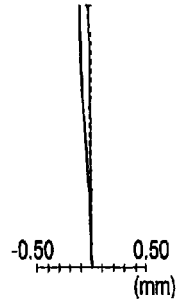
Figure 11C:
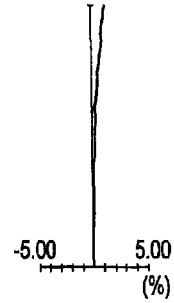
Figure 11D:
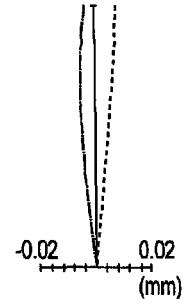
Figure 11E:
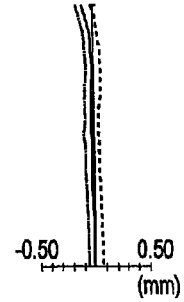
Figure 11F:
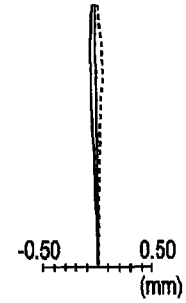
Figure 11G:
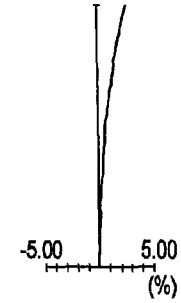
Figure 11H:
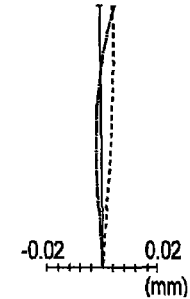
Figure 11I:
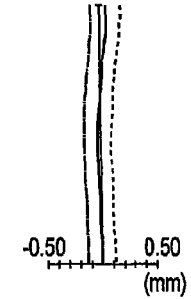
Figure 11J:
Figure 11K:
Figure 11L:
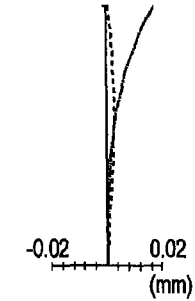
Figure 12A:
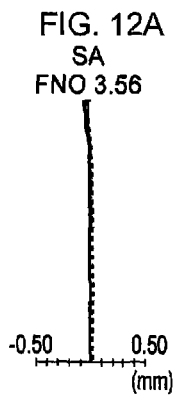
FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L show aberrations in the cases of focusing on an infinity object, a first short-distance object, and a second short-distance object in Example 6.
Figure 12B:
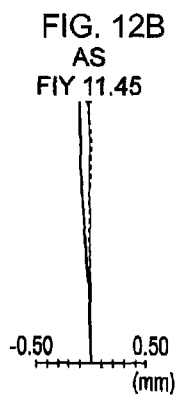
Figure 12C:
Figure 12D:
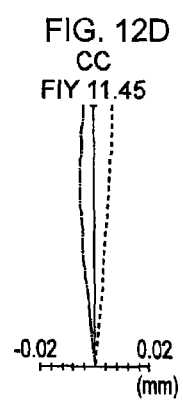
Figure 12E:
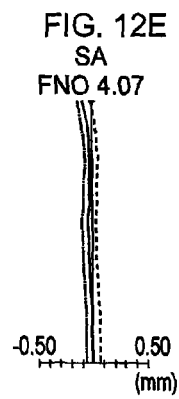
Figure 12F:
Figure 12G:
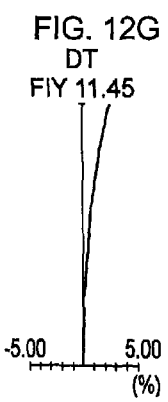
Figure 12H:
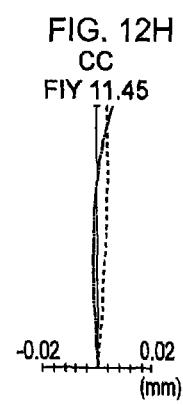
Figure 12I:
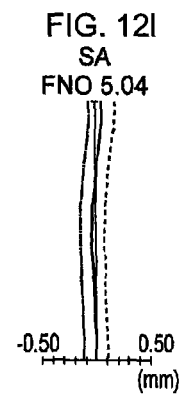
Figure 12J:
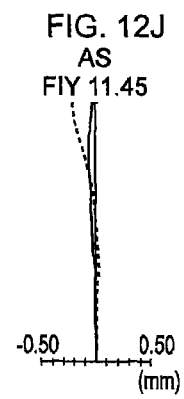
Figure 12K:
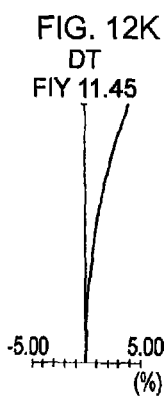
Figure 12L:
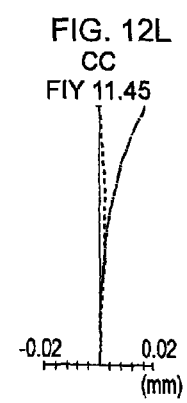

As shown in FIGS. 6A, 6B and 6C, Example 6 is directed to an inner focus macrolens including sequentially from an object side: a first lens unit G1 having positive refractive power; a second lens unit G2 having positive refractive power; a third lens unit G3 having negative refractive power, and a fourth lens unit G4 having positive refractive power. An aperture stop (stop) S is disposed between the first lens unit G1 and the second lens unit G2.

The first lens unit G1 includes a biconcave negative lens L1 and a biconvex positive lens L2.

The second lens unit G2 includes a negative meniscus lens L3 having a convex surface facing the image side, a positive meniscus lens L4 having a convex surface facing the image side, and a biconvex positive lens L5. Here, the negative meniscus lens L3 and the positive meniscus lens L4 are cemented The third lens unit G3 includes a biconcave negative lens L6.

The fourth lens unit G4 includes a biconvex positive lens L7.

In focusing from the infinity object to the short-distance object, the third lens unit G3 moves toward the image side, the first lens unit G1, the second lens unit G2, and the fourth lens unit G4 are fixed (stops).

An aspheric surface is provided to a total of six surfaces, both surfaces of the biconcave negative lens L1, both surfaces of the biconvex positive lens L5, and both surfaces of the biconcave negative lens L6.

Numerical data of each example described above is shown below. Apart from symbols described above, r denotes radius of curvature of each lens surface, d denotes a distance between respective lens surfaces, nd denotes a refractive index of each lens for a d-line, vd denotes an Abbe number for each lens and * denotes an aspheric surface. Further, f denotes a focal length of the entire system, FNO. denotes an F number, ω denotes a half angle of view, IH denotes an image height, FB denotes a back focus. Lens total length is the sum of the distance from the lens surface closest to the object side to the lens surface closest to the image side in the inner focus macrolens and the back focus FB. The focal lengths f1, f2, ... of the respective lens units will also be presented. The back focus FB is the distance from the last lens surface to the paraxial image plane, expressed in the equivalent air distance.

In data below, "infinity" denotes the case of focusing on an infinity object, "–0.5 time" denotes the case in focusing on an object at a photographing magnification of –0.5, and "–1.0 time" denotes the case in focusing on an object at a photographing magnification of –1.0.

An aspheric surface shape is expressed by the following expression when z is an optical axis letting a direction of travel of light to be positive, and y is let to be a direction orthogonal to the optical axis.

$$z=(y^2/r)/[1+\{1-(k+1)(y/r)^2\}^{1/2}]+A4y^4+A6y^6+A8y^8+A10y^{10}+A12y^{12}$$

where, r denotes a paraxial radius of curvature, k denotes a conical coefficient, and A4, A6, A8, A10, and A12 are aspheric coefficients of fourth order, sixth order, eighth order, tenth order, and twelfth order respectively. Moreover, in aspheric coefficients, 'e$^{-n}$' (n is an integer) indicates '10$^{-n}$'. Moreover, these symbols are commonly used in the following numerical data for each example.

Example 1

Unit mm

Surface data

| Surface no. | r | d | nd | vd |
|---|---|---|---|---|
| 1* | 120.643 | 1.20 | 1.58313 | 59.38 |
| 2* | 13.015 | 4.03 | | |
| 3 | 20.388 | 2.23 | 1.68893 | 31.07 |
| 4 | −82.712 | 2.45 | | |
| 5 (Stop) | ∞ | 9.00 | | |
| 6 | −8.842 | 0.80 | 1.76182 | 26.52 |
| 7 | −64.178 | 3.77 | 1.71700 | 47.92 |
| 8* | −12.546 | 0.24 | | |
| 9* | 23.315 | 4.96 | 1.49700 | 81.61 |
| 10* | −13.786 | Variable | | |
| 11* | −89.300 | 1.00 | 1.53071 | 55.69 |
| 12* | 14.544 | Variable | | |
| 13 | 36.796 | 3.60 | 1.90043 | 37.37 |
| 14 | 304.583 | 16.33 | | |
| 15 | ∞ | 6.08 | 1.51633 | 64.14 |
| 16 | ∞ | 0.75 | | |
| Image plane | ∞ | | | |

Aspherical surface data

1st surface k = 0.000
A4 = 6.01018e−05, A6 = −1.96853e−06, A8 = 2.65259e−08,
A10 = −1.53800e−10

2nd surface k = −1.512
A4 = 1.11183e−04, A6 = −2.30063e−06, A8 = 2.43499e−08,
A10 = −9.72110e−11

9th surface k = 0.000
A4 = −4.27673e−05, A6 = −1.38786e−07, A8 = 3.67187e−09,
A10 = −1.97732e−11

10th surface k = 0.000
A4 = 7.10611e−05, A6 = 7.09134e−08, A8 = −1.19545e−10,
A10 = 1.25924e−11

11th surface k = 0.000
A4 = −3.89330e−05, A6 = 1.59672e−06, A8 = −2.82232e−08,
A10 = 1.74647e−10

12th surface k = 0.000
A4 = −6.45827e−05, A6 = 1.39310e−06, A8 = −2.72708e−08,
A10 = 1.69554e−10

Various data

| photographing magnification | infinity | −0.5 time | −1.0 time |
|---|---|---|---|
| Focal length | 29.40 | 25.50 | 20.39 |
| Fno. | 3.56 | 4.17 | 5.05 |
| Angle of view (2ω) | 41.56 | 42.85 | 44.59 |
| FB (in air) | 21.09 | 21.09 | 21.09 |
| Lens total length (in air) | 72.58 | 72.58 | 72.58 |
| IH | 11.15 | 11.15 | 11.15 |
| d10 | 1.81 | 6.87 | 12.79 |
| d12 | 16.41 | 11.35 | 5.42 |

Unit focal length

| f1 = 112.02 | f2 = 18.53 | f3 = −23.49 | f4 = 46.19 |
|---|---|---|---|

Example 2

Unit mm

Surface data

| Surface no. | r | d | nd | vd |
|---|---|---|---|---|
| 1* | −132.122 | 1.20 | 1.58313 | 59.38 |
| 2* | 13.974 | 5.18 | | |
| 3 | 27.759 | 3.62 | 1.80100 | 34.97 |
| 4 | −30.669 | 0.25 | | |
| 5 | −95.570 | 1.20 | 1.83481 | 42.73 |
| 6 | 275.667 | 4.45 | | |
| 7 (Stop) | ∞ | 7.47 | | |
| 8 | −10.861 | 1.00 | 1.78470 | 26.29 |
| 9 | −71.887 | 3.59 | 1.71700 | 47.92 |
| 10 | −14.552 | 0.43 | | |
| 11* | 27.788 | 5.38 | 1.49700 | 81.61 |
| 12* | −15.545 | Variable | | |
| 13* | 173.501 | 1.00 | 1.53071 | 55.69 |
| 14* | 14.965 | Variable | | |
| 15 | −749.082 | 2.88 | 1.91082 | 35.25 |
| 16 | −45.630 | 14.90 | | |
| 17 | ∞ | 6.08 | 1.51633 | 64.14 |
| 18 | ∞ | 0.75 | | |
| Image plane | ∞ | | | |

-continued

| Unit mm |
|---|
| Aspherical surface data |

1st surface k = 0.000
A4 = 5.43298e−05, A6 = −1.60043e−06, A8 = 1.82193e−08,
A10 = −8.42615e−11
2nd surface k = −7.607
A4 = 3.82673e−04, A6 = −5.84659e−06, A8 = 6.36029e−08,
A10 = −3.11239e−10
11th surface k = 0.000
A4 = −3.52687e−05, A6 = −9.37214e−08, A8 = 3.67259e−09,
A10 = −7.37681e−11
12th surface k = 0.000
A4 = 4.34420e−05, A6 = 2.66574e−08, A8 = 1.64380e−09,
A10 = −5.34814e−11
13th surface k = 0.000
A4 = −8.70244e−05, A6 = 2.11602e−06, A8 = −3.29988e−08,
A10 = 1.99760e−10
14th surface k = 0.000
A4 = −9.64721e−05, A6 = 1.81187e−06, A8 = −2.98767e−08,
A10 = 1.83932e−10

| Various data | | | |
|---|---|---|---|
| photographing magnification | infinity | −0.5 time | −1.0 time |
| Focal length | 30.60 | 27.94 | 23.12 |
| Fno. | 2.88 | 3.37 | 4.05 |
| Angle of view (2ω) | 39.68 | 39.58 | 40.10 |
| FB (in air) | 19.66 | 19.66 | 19.66 |
| Lens total length (in air) | 82.60 | 82.60 | 82.60 |
| IH | 11.15 | 11.15 | 11.15 |
| d12 | 1.80 | 7.86 | 15.39 |
| d14 | 23.30 | 17.24 | 9.71 |

| Unit focal length | | | |
|---|---|---|---|
| f1 = 127.76 | f2 = 21.79 | f3 = −30.93 | f4 = 53.24 |

Example 3

| Unit mm | | | | |
|---|---|---|---|---|
| Surface data | | | | |
| Surface no. | r | d | nd | vd |
| 1* | −173.886 | 1.20 | 1.58313 | 59.38 |
| 2* | 12.854 | 3.74 | | |
| 3 | 23.400 | 4.01 | 1.80100 | 34.97 |
| 4 | −32.207 | 0.10 | | |
| 5 | −132.018 | 1.20 | 1.83481 | 42.73 |
| 6 | 99.253 | 5.71 | | |
| 7 (Stop) | ∞ | 6.59 | | |
| 8 | −10.677 | 1.00 | 1.75520 | 27.51 |
| 9 | −5097.480 | 3.84 | 1.71700 | 47.92 |
| 10 | −14.881 | 0.10 | | |
| 11* | 27.044 | 5.44 | 1.49700 | 81.61 |
| 12* | −15.287 | Variable | | |
| 13* | 63760.671 | 1.00 | 1.51633 | 64.06 |
| 14* | 16.139 | Variable | | |
| 15 | −1085.584 | 3.12 | 1.88100 | 40.14 |
| 16 | −41.841 | 16.10 | | |
| 17 | ∞ | 6.08 | 1.51633 | 64.14 |
| 18 | ∞ | 0.75 | | |
| Image plane | ∞ | | | |

| Aspherical surface data |
|---|

1st surface k = 0.000
A4 = 3.09049e−05, A6 = −1.12291e−06, A8 = 1.26085e−08,
A10 = −5.71221e−11
2nd surface k = −5.848
A4 = 3.46807e−04, A6 = −4.72057e−06, A8 = 4.81395e−08,
A10 = −2.27218e−10
11th surface k = 0.000
A4 = −3.11921e−05, A6 = −1.51884e−07, A8 = 4.65354e−09,
A10 = −8.02115e−11
12th surface k = 0.000
A4 = 4.76339e−05, A6 = 2.40882e−08, A8 = 1.98303e−09,
A10 = −5.66114e−11
13th surface k = 0.000
A4 = −5.31299e−05, A6 = 1.80243e−06, A8 = −3.24793e−08,
A10 = 2.09880e−10
14th surface k = 0.000
A4 = −5.57847e−05, A6 = 1.53899e−06, A8 = −2.97334e−08,
A10 = 1.99682e−10

| Various data | | | |
|---|---|---|---|
| photographing magnification | infinity | −0.5 time | −1.0 time |
| Focal length | 30.15 | 28.00 | 23.19 |
| Fno. | 2.88 | 3.33 | 4.06 |
| Angle of view (2ω) | 40.36 | 39.68 | 39.60 |
| FB (in air) | 20.85 | 20.85 | 20.85 |
| Lens total length (in air) | 82.59 | 82.59 | 82.59 |
| IH | 11.15 | 11.15 | 11.15 |
| d12 | 2.05 | 8.51 | 16.53 |
| d14 | 22.65 | 16.19 | 8.17 |

| Unit focal length | | | |
|---|---|---|---|
| f1 = 247.88 | f2 = 21.28 | f3 = −31.27 | f4 = 49.33 |

Example 4

| Unit mm | | | | |
|---|---|---|---|---|
| Surface data | | | | |
| Surface no. | r | d | nd | vd |
| 1* | −44.446 | 1.20 | 1.58913 | 61.15 |
| 2* | 14.422 | 4.19 | | |
| 3 | 29.896 | 4.00 | 1.76200 | 40.10 |
| 4 | −29.896 | 7.73 | | |
| 5 (Stop) | ∞ | 7.50 | | |
| 6 | −11.586 | 1.00 | 1.78472 | 25.68 |
| 7 | −136.109 | 3.50 | 1.79952 | 42.22 |
| 8 | −16.571 | 0.10 | | |
| 9* | 31.265 | 5.17 | 1.49700 | 81.61 |
| 10* | −15.837 | Variable | | |
| 11* | −116.043 | 1.00 | 1.53071 | 55.69 |
| 12* | 18.443 | Variable | | |

-continued

Unit mm

| 13 | −672.762 | 3.05 | 1.91082 | 35.25 |
|---|---|---|---|---|
| 14 | −42.321 | 17.03 | | |
| 15 | ∞ | 6.08 | 1.51633 | 64.14 |
| 16 | ∞ | 0.75 | | |
| Image plane | ∞ | | | |

Aspherical surface data

1st surface k = 0.000
A4 = 1.46808e−06, A6 = −3.89840e−07, A8 = 5.33152e−09,
A10 = −2.84776e−11

2nd surface k = −5.763
A4 = 2.08526e−04, A6 = −2.44925e−06, A8 = 2.31805e−08,
A10 = −1.07958e−10

9th surface k = 0.000
A4 = −2.51040e−05, A6 = −3.08365e−08, A8 = 1.04837e−09,
A10 = −3.24450e−11

10th surface k = 0.000
A4 = 4.35240e−05, A6 = 1.26550e−07, A8 = −1.40153e−09,
A10 = −1.40823e−11

11th surface k = 0.000
A4 = 6.88820e−05, A6 = −1.18294e−06, A8 = 7.63911e−09,
A10 = −8.60382e−12

12th surface k = 0.000
A4 = 7.52909e−05, A6 = −1.42844e−06, A8 = 1.06381e−08,
A10 = −2.32046e−11

Various data

| photographing magnification | infinity | −0.5 time | −1.0 time |
|---|---|---|---|
| Focal length | 30.60 | 27.87 | 22.67 |
| Fno. | 2.88 | 3.27 | 4.05 |
| Angle of view (2ω) | 39.81 | 38.99 | 38.76 |
| FB (in air) | 21.78 | 21.78 | 21.78 |
| Lens total length (in air) | 82.65 | 82.65 | 82.65 |
| IH | 11.15 | 11.15 | 11.15 |
| d10 | 1.78 | 8.16 | 16.05 |
| d12 | 20.65 | 14.27 | 6.38 |

Unit focal length

| f1 = 100.59 | f2 = 23.15 | f3 = −29.91 | f4 = 49.47 |
|---|---|---|---|

Example 5

Unit mm

Surface data

| Surface no. | r | d | nd | νd |
|---|---|---|---|---|
| 1* | −93.408 | 1.20 | 1.58913 | 61.15 |
| 2* | 9.578 | 1.31 | | |
| 3 | 14.081 | 2.89 | 1.72342 | 37.95 |
| 4 | −41.422 | 3.77 | | |
| 5 (Stop) | ∞ | 7.00 | | |
| 6 | −8.131 | 0.80 | 1.76182 | 26.52 |
| 7 | −58.304 | 3.21 | 1.78590 | 44.20 |
| 8 | −12.090 | 0.10 | | |
| 9* | 30.612 | 4.36 | 1.49700 | 81.61 |
| 10* | −13.083 | Variable | | |

-continued

Unit mm

| 11* | −151.046 | 1.00 | 1.53071 | 55.69 |
|---|---|---|---|---|
| 12* | 16.484 | Variable | | |
| 13 | 588.028 | 3.22 | 1.90043 | 37.37 |
| 14 | −43.923 | 15.44 | | |
| 15 | ∞ | 6.08 | 1.51633 | 64.14 |
| 16 | ∞ | 0.75 | | |
| Image plane | ∞ | | | |

Aspherical surface data

1st surface k = 0.000
A4 = −3.76681e−05, A6 = 5.98000e−07, A8 = −1.52780e−08,
A10 = 1.43938e−10

2nd surface k = −1.928
A4 = 1.34322e−04, A6 = −4.22036e−08, A8 = −1.92115e−08,
A10 = 2.61862e−10

9th surface k = 0.000
A4 = −2.91531e−05, A6 = −1.57669e−07, A8 = 4.01153e−09,
A10 = −6.93487e−11

10th surface k = 0.000
A4 = 6.90386e−05, A6 = 1.92499e−07, A8 = −2.21848e−09,
A10 = −4.27557e−12

11th surface k = 0.000
A4 = −1.30994e−05, A6 = 1.29625e−06, A8 = −3.73529e−08,
A10 = 3.33059e−10

12th surface k = 0.000
A4 = −1.62184e−05, A6 = 1.04955e−06, A8 = −3.25661e−08,
A10 = 2.89548e−10

Various data

| photographing magnification | infinity | −0.5 time | −1.0 time |
|---|---|---|---|
| Focal length | 30.58 | 28.12 | 22.78 |
| Fno. | 3.56 | 4.09 | 5.05 |
| Angle of view (2ω) | 39.65 | 39.08 | 39.12 |
| FB (in air) | 20.20 | 20.20 | 20.20 |
| Lens total length (in air) | 71.61 | 71.61 | 71.61 |
| IH | 11.15 | 11.15 | 11.15 |
| d10 | 1.80 | 8.03 | 15.76 |
| d12 | 20.76 | 14.53 | 6.79 |

Unit focal length

| f1 = 132.49 | f2 = 20.02 | f3 = −27.95 | f4 = 45.50 |
|---|---|---|---|

Example 6

Unit mm

Surface data

| Surface no. | r | d | nd | νd |
|---|---|---|---|---|
| 1* | −110.619 | 1.20 | 1.58913 | 61.15 |
| 2* | 9.864 | 1.57 | | |
| 3 | 14.784 | 2.81 | 1.72342 | 37.95 |
| 4 | −43.126 | 3.61 | | |
| 5 (Stop) | ∞ | 7.00 | | |
| 6 | −8.479 | 0.80 | 1.76182 | 26.52 |
| 7 | −211.110 | 3.32 | 1.79952 | 42.22 |
| 8 | −12.930 | 0.10 | | |

-continued

| Unit mm | | | | |
|---|---|---|---|---|
| 9* | 30.372 | 4.35 | 1.49700 | 81.61 |
| 10* | −13.132 | Variable | | |
| 11* | −115.656 | 1.00 | 1.51633 | 64.06 |
| 12* | 16.396 | Variable | | |
| 13 | 634.004 | 3.34 | 1.83481 | 42.73 |
| 14 | −40.668 | 16.04 | | |
| 15 | ∞ | 6.08 | 1.51633 | 64.14 |
| 16 | ∞ | 0.75 | | |
| Image plane | ∞ | | | |

Aspherical surface data

1st surface k = 0.000
A4 = −3.32176e−05, A6 = 5.48670e−07, A8 = −1.44850e−08,
A10 = 1.39256e−10
2nd surface k = −1.967
A4 = 1.28821e−04, A6 = −6.24774e−08, A8 = −1.87604e−08,
A10 = 2.57096e−10
9th surface k = 0.000
A4 = −2.85655e−05, A6 = −1.62203e−07, A8 = 3.86801e−09,
A10 = −7.91556e−11
10th surface k = 0.000
A4 = 7.16927e−05, A6 = 1.84655e−07, A8 = −1.83473e−09,
A10 = −2.03651e−11
11th surface k = 0.000
A4 = −9.84785e−06, A6 = 1.29117e−06, A8 = −3.74635e−08,
A10 = 3.33054e−10
12th surface k = 0.000
A4 = −1.28247e−05, A6 = 1.02065e−06, A8 = −3.21827e−08,
A10 = 2.85706e−10

Various data

| photographing magnification | infinity | −0.5 time | −1.0 time |
|---|---|---|---|
| Focal length | 30.43 | 27.80 | 22.49 |
| Fno. | 3.56 | 4.07 | 5.04 |
| Angle of view (2ω) | 39.89 | 39.23 | 39.15 |
| FB (in air) | 20.79 | 20.79 | 20.79 |
| Lens total length (in air) | 71.61 | 71.61 | 71.61 |
| IH | 11.15 | 11.15 | 11.15 |
| d10 | 1.80 | 7.96 | 15.56 |
| d12 | 19.92 | 13.76 | 6.16 |

Unit focal length

| f1 = 129.33 | f2 = 20.16 | f3 = −27.74 | f4 = 45.88 |
|---|---|---|---|

Aberration diagrams of the examples from the example 1 to example 6 are shown in FIG. 7A to FIG. 12L. In each diagram, 'FIY' denotes the maximum image height.

In the aberration diagrams, FIG. 7A, FIG. 8A, FIG. 9A, FIG. 10A, FIG. 11A, and FIG. 12A show a spherical aberration (SA) at the case of focusing on an infinity object, FIG. 7B, FIG. 8B, FIG. 9B, FIG. 10B, FIG. 11B, and FIG. 12B show an astigmatism (AS) at the case of focusing on an infinity object, FIG. 7C, FIG. 8C, FIG. 9C, FIG. 10C, FIG. 11C, and FIG. 12C show a distortion (DT) at the case of focusing on an infinity object, and FIG. 7D, FIG. 8D, FIG. 9D, FIG. 10D, FIG. 11D, and FIG. 12D show a chromatic aberration of magnification (CC) at the case of focusing on an infinity object.

In the aberration diagrams, FIG. 7E, FIG. 8E, FIG. 9E, FIG. 10E, FIG. 11E, and FIG. 12E show a spherical aberration (SA) at the case of focusing on a first short-distance object, FIG. 7F, FIG. 8F, FIG. 9F, FIG. 10F, FIG. 11F, and FIG. 12F show an astigmatism (AS) at the case of focusing on a first short-distance object, FIG. 7G, FIG. 8G, FIG. 9G, FIG. 10G, FIG. 11G, and FIG. 12G show a distortion (DT) at the case of focusing on a first short-distance object, and FIG. 7H, FIG. 8H, FIG. 9H, FIG. 10H, FIG. 11H, and FIG. 12H show a chromatic aberration of magnification (CC) at the case of focusing on a first short-distance object.

In the aberration diagrams, FIG. 7I, FIG. 8I, FIG. 9I, FIG. 10I, FIG. 11I, and FIG. 12I show a spherical aberration (SA) at the case of focusing on a second short-distance object, FIG. 7J, FIG. 8J, FIG. 9J, FIG. 10J, FIG. 11J, and FIG. 12J show an astigmatism (AS) at the case of focusing on a second short-distance object, FIG. 7K, FIG. 8K, FIG. 9K, FIG. 10K, FIG. 11K, and FIG. 12K show a distortion (DT) at the case of focusing on a second short-distance object, and FIG. 7L, FIG. 8L, FIG. 9L, FIG. 10L, FIG. 11L, and FIG. 12L show a chromatic aberration of magnification (CC) at the case of focusing on a second short-distance object.

Correspondence values of the conditional expressions are shown as below.

| Conditional expressions | Example 1 | Example 2 | Example 3 |
|---|---|---|---|
| (1) $(1 - \beta_3^2)\beta_4^2$ | −3.10 | −2.74 | −2.54 |
| (2) $(R_{2f} + R_{2r})/(R_{2f} - R_{2r})$ | −1.32 | −1.36 | −1.00 |
| (3) $f_1/f$ | 3.81 | 4.18 | 8.22 |
| (4) $f_4/f$ | 1.57 | 1.74 | 1.64 |
| (5) $f_2/f$ | 0.63 | 0.71 | 0.71 |
| (6) $f_3/f$ | −0.80 | −1.01 | −1.04 |
| (7) $f_{12}/f$ | 0.55 | 0.56 | 0.59 |
| (8) $D_{23}/TL$ | 0.15 | 0.16 | 0.18 |
| (9) $D_3/D_{23}$ | 0.091 | 0.074 | 0.069 |

| Conditional expressions | Example 4 | Example 5 | Example 6 |
|---|---|---|---|
| (1) $(1 - \beta_3^2)\beta_4^2$ | −2.60 | −2.67 | −2.68 |
| (2) $(R_{2f} + R_{2r})/(R_{2f} - R_{2r})$ | −1.19 | −1.32 | −1.08 |
| (3) $f_1/f$ | 3.29 | 4.33 | 4.25 |
| (4) $f_4/f$ | 1.62 | 1.49 | 1.51 |
| (5) $f_2/f$ | 0.76 | 0.65 | 0.66 |
| (6) $f_3/f$ | −0.98 | −0.91 | −0.91 |
| (7) $f_{12}/f$ | 0.59 | 0.58 | 0.58 |
| (8) $D_{23}/TL$ | 0.17 | 0.19 | 0.19 |
| (9) $D_3/D_{23}$ | 0.070 | 0.072 | 0.073 |

FIG. 13 is a cross-sectional view of a single-lens mirrorless camera as an electronic image pickup apparatus. In FIG. 13, a lens system 2 is disposed inside a lens barrel of a single-lens mirrorless camera 1. A mount portion 3 enables the lens system 2 to be detachable from a body of the single-lens mirrorless camera 1. As the mount portion 3, a mount such as a screw-type mount and a bayonet-type mount is to be used. In this example, a bayonet-type mount is used. Moreover, an image pickup element surface 4 and a back monitor 5 are disposed in the body of the single-lens mirrorless camera 1. As an image pickup element, an element such as a CCD (charge coupled device), a CMOS (complementary metal-oxide semiconductor) or any kind of image pickup sensor is to be used.

Moreover, as the lens system 2 of the single-lens mirrorless camera 1, the image forming lens system described in any one of the examples from the first example to the sixth example is to be used.

Figure 14:
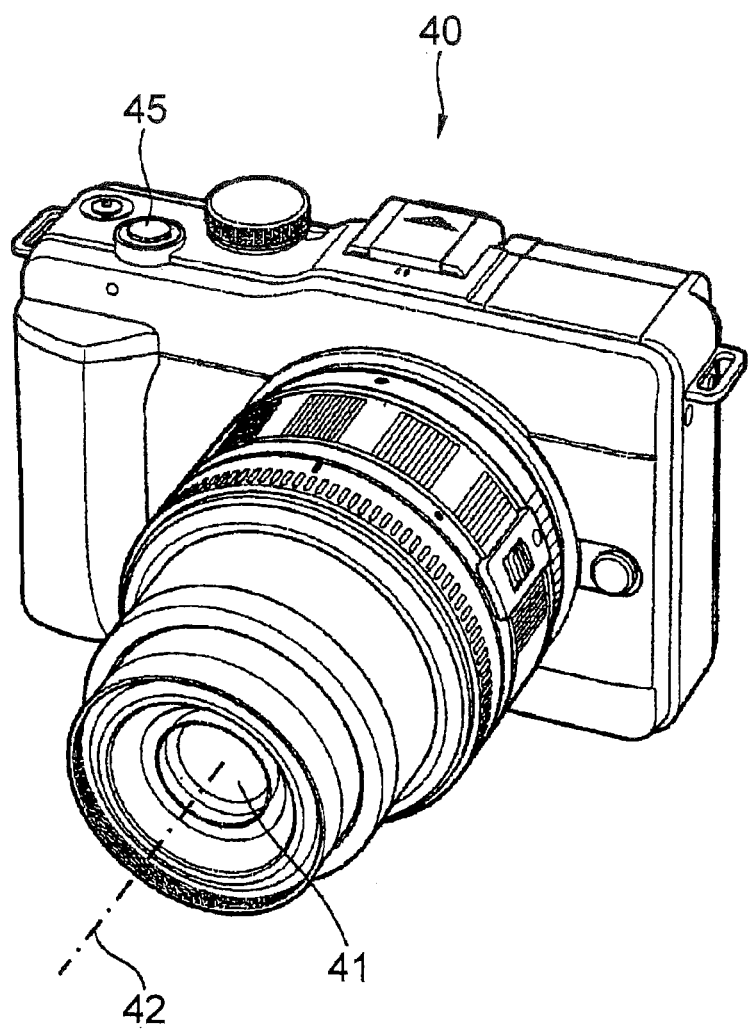
FIG. 14 is a front perspective view of the image pickup device.
Figure 15:
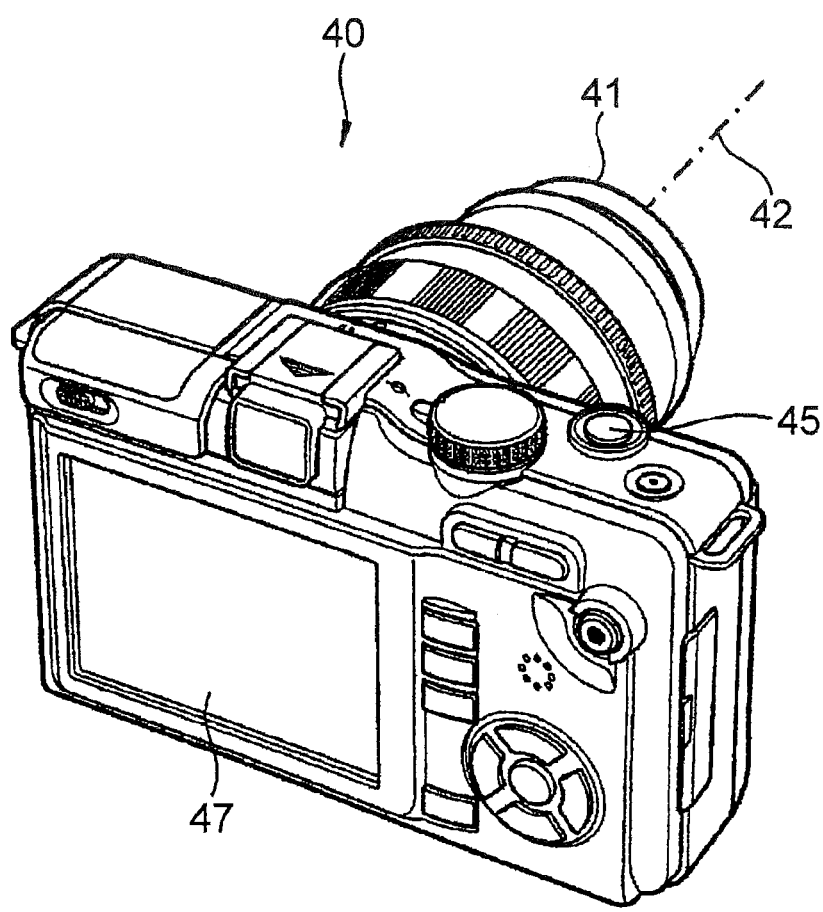
FIG. 15 is a rear perspective view of the image pickup device.

FIG. 14 and FIG. 15 are conceptual diagrams of an arrangement of the image pickup apparatus according to the present invention. FIG. 14 is a front perspective view showing an appearance of a digital camera 40 as the image pickup apparatus, and FIG. 15 is a rear perspective view of the digital camera 40. The image forming lens system, or an inner focus macrolens system according to the present invention is used in a photographic optical system 41 of the digital camera 40.

The digital camera 40 according to the present embodiment includes the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography is carried out by the photographic optical system 41 such as the inner focus macrolens system according to the first example. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processor. Moreover, it is possible to record the electronic image which has been photographed, in a memory.

Figure 16:
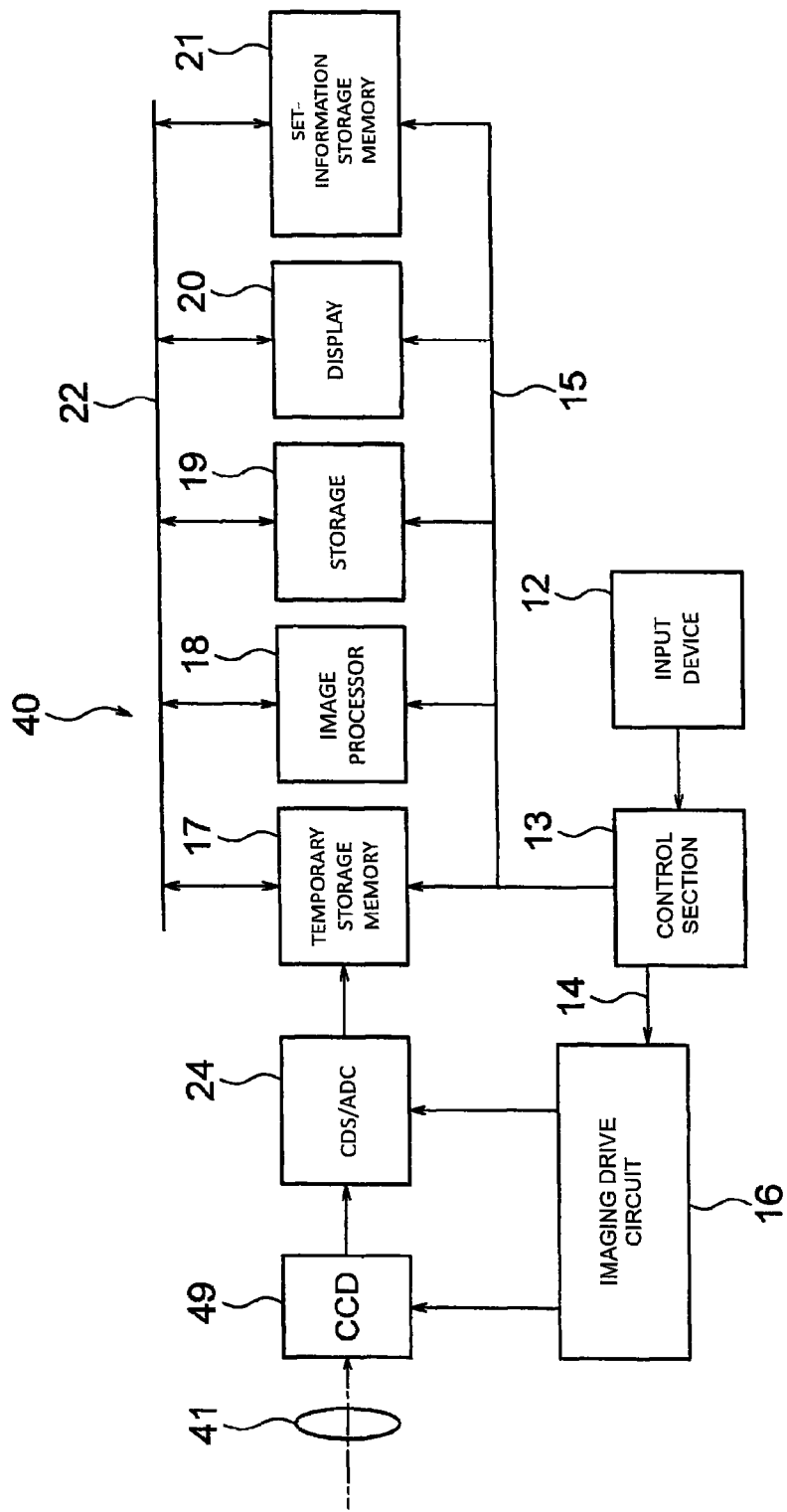
FIG. 16 is a block diagram showing a configuration of an internal circuit in a main portion of the image pickup device.

FIG. 16 is a structural block diagram of an internal circuit of main components of the digital camera 40. In the following description, the processor described above includes for instance, a CDS/ADC 24, a temporary storage memory 17, and an image processor 18, and a storage 19 for example.

As shown in FIG. 16, the digital camera 40 includes an input device 12, a control section 13 which is connected to the input device 12, the temporary storage memory 17 and an imaging drive circuit 16 which are connected to a control-signal output port of the control section 13, via a bus 14 and a bus 15, the image processor 18, the storage 19, a display 20, and a set-information storage memory 21.

The temporary storage memory 17, the image processor 18, the storage 19, the display 20, and the set-information storage memory 21 are structured to be capable of mutually inputting and outputting data via a bus 22. Moreover, the CCD 49 and the CDS/ADC 24 are connected to the imaging drive circuit 16.

The input device 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the digital camera 40 according to a computer program stored in this computer program memory.

The CCD 49 is driven and controlled by the imaging drive circuit 16, and which converts an amount of light for each pixel of the object image to an electric signal, and outputs to the CDS/ADC 24.

The CDS/ADC 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC 24. The image processor 18 is a circuit which reads the RAW data stored in the temporary storage memory 17, or the RAW data stored in the storage 19, and carries out electrically various image-processing including the distortion correction, based on image-quality parameters specified by the control section 13.

The storage 19 is a recording medium in the form of a card or a stick including a flash memory for instance, detachably mounted. The storage 19 records and maintains the RAW data transferred from the temporary storage memory 17 and image data subjected to image processing in the image processor 18 in the card flash memory and the stick flash memory.

The display 20 includes the liquid-crystal display monitor, and displays images and operation menu on the liquid-crystal display monitor. The set-information storage memory 21 includes a ROM section in which various image quality parameters are stored in advance, and a RAM section which stores image quality parameters which are selected by an input operation on the input device 12, from among the image quality parameters which are read from the ROM section.

In the digital camera 40 in which such an arrangement is made, by adopting the inner focus macrolens system according to the present invention as the photographing optical system 41, it is possible to achieve the image pickup apparatus for photography with high resolution without a degradation of an image quality. The inner focus macrolens system according to the present invention may be adopted to the image pickup apparatus including an instant return mirror.

In the digital camera 40 in which such an arrangement is made, by adopting the inner focus macrolens system according to the examples as the photographing optical system 41, it is possible to achieve the compact image pickup apparatus with good image formation performance and a small variation of photographing magnification during focusing.

The present invention can have various modified examples without departing from the scope of the invention. Moreover, shapes of lenses and the number of lenses are not restricted to the shapes of lenses and the number of lenses indicated by each example. In each of the abovementioned examples, the cover glass C may not be disposed necessarily. A lens which is not shown in the diagrams of the examples described heretofore, and which essentially has no refractive power may be disposed in a lens unit or outside a lens unit.

What is claimed is:

1. An inner focus macrolens comprising sequentially from an object side:
   a first lens unit;
   an aperture stop;
   a second lens unit having a positive refractive power;
   a third lens unit having a negative refractive power; and
   a fourth lens unit having a positive refractive power,
   wherein
   the first lens unit comprises a negative lens as the closest powered lens to the object side and a positive lens,
   the second lens unit comprises sequentially from the object side:
   a negative meniscus lens having a convex surface facing the image side, a positive meniscus lens having a convex surface facing the image side, and a biconvex positive lens,
   the third lens unit comprises a negative lens,
   the fourth lens unit comprises a positive lens,
   wherein focusing is performed by moving the third lens unit toward an image side, and the inner focus macrolens satisfies conditional expressions (1) and (2):

$$-5 <= (1-\beta_3^2) \times \beta_4^2 <= -2 \quad (1)$$

$$-4 <= (R2f+R2r)/(R2f-R_{2r}) <= 0.4 \quad (2)$$

wherein beta3 is a lateral magnification of the third lens unit in focusing on an infinity object, beta4 is a lateral magnification of the fourth lens unit in focusing on the infinity object, R2f is a radius of curvature of an object side surface of the object side negative lens, and R2r is a radius of curvature of an image side surface of the object side negative lens.

2. The inner focus macrolens according to claim 1, wherein the inner focus macrolens satisfies conditional expression (3):

$$1.2 \le f_1/f \le 30 \quad (3)$$

wherein,
$f_1$ is a focal length of the first lens unit, and
f is a focal length of the inner focus macrolens on an infinity object.

3. The inner focus macrolens according to claim 1 satisfies conditional expression (4):

$$1.2 \le f_4/f \le 2 \quad (4)$$

wherein,
$f_4$ is a focal length of the fourth lens unit, and
f is a focal length of the inner focus macrolens in focusing on an infinity object.

4. The inner focus macrolens according to claim 1 satisfies conditional expression (5):

$$0.2 \le f_2/f \le 1.0 \quad (5)$$

wherein
$f_2$ is a focal length of the second lens unit, and
f is a focal length of the inner focus macrolens in focusing on an infinity object.

5. The inner focus macrolens according to claim 1 satisfies conditional expression (6):

$$-3.0 \le f_3/f \le -0.1 \quad (6)$$

wherein
$f_3$ is a focal length of the third lens unit, and
f is a focal length of the inner focus macrolens in focusing on an infinity object.

6. The inner focus macrolens according to claim 1 satisfies conditional expression (7):

$$0.40 \le f_{12}/f \le 0.80 \quad (7)$$

wherein
$f_{12}$ is a composite focal length of the first lens unit and the second lens unit in focusing on the infinity object, and
f is a focal length of the inner focus macrolens on an infinity object.

7. The inner focus macrolens according to claim 1 satisfies conditional expression (8):

$$0.10 \le D_{23}/TL \le 0.30 \quad (8)$$

wherein
$D_{23}$ is the amount of movement of the third lens unit, and
TL is a total length of the inner focus macrolens.

8. The inner focus macrolens according to claim 1 satisfies conditional expression (9):

$$0.03 \le D_3/D_{23} \le 0.20 \quad (9)$$

wherein
$D_3$ is the thickness of the third lens unit, and
$D_{23}$ is the maximum amount of movement of the third lens unit.

9. The inner focus macrolens according to claim 1, wherein the refractive power of the first lens unit is a positive refractive power.

10. The inner focus macrolens according to claim 1, wherein the first lens unit includes sequentially from the object side: a negative lens and a positive lens.

11. The inner focus macrolens according to claim 1, wherein the first lens unit includes sequentially from the object side:
a negative lens having a concave surface facing the image side and
a biconvex positive lens.

12. The inner focus macrolens according to claim 1, wherein the first lens unit includes a biconcave negative lens and a biconvex positive lens.

13. The inner focus macrolens according to claim 1, wherein the second lens unit includes sequentially from the object side:
a negative lens;
a positive lens; and
a positive lens.

14. The inner focus macrolens according to claim 1, wherein the third lens unit includes a negative lens having a concave surface facing the image side.

15. The inner focus macrolens according to claim 1, wherein the fourth lens unit is a positive single lens.

16. The inner focus macrolens according to claim 1, wherein the fourth lens unit is fixed during focusing.

17. An image pickup device comprising:
an inner focus macrolens of claim 1; and
an image pickup sensor having an image pickup plane and configured to convert an image formed on the image pickup plane by the inner focus macrolens into an electric signal.

* * * * *

UNITED STATES PATENT AND TRADEMARK OFFICE
CERTIFICATE OF CORRECTION

PATENT NO. : 9,791,677 B2
APPLICATION NO. : 14/943550
DATED : October 17, 2017
INVENTOR(S) : Masaru Morooka Page 1 of 1

It is certified that error appears in the above-identified patent and that said Letters Patent is hereby corrected as shown below:

In the Claims

Column 22, Line 45, Claim 1 to Column 23, Line 8 should read:
1. An inner focus macrolens comprising sequentially from an object side:
   a first lens unit;
   an aperture stop;
   a second lens unit having a positive refractive power;
   a third lens unit having a negative refractive power; and
   a fourth lens unit having a positive refractive power, wherein
   the first lens unit comprises a negative lens as the closest powered lens to the object side and a positive lens,
   the second lens unit comprises sequentially from the object side:
   a negative meniscus lens having a convex surface facing the image side, a positive meniscus lens having a convex surface facing the image side, and a biconvex positive lens,
   the third lens unit comprises a negative lens,
   the fourth lens unit comprises a positive lens,
   wherein focusing is performed by moving the third lens unit toward an image side, and the inner focus macrolens satisfies conditional expressions (1) and (2):
   $-5 <= (1-\beta_3^2) \times \beta_4^2 <= -2$ (1)
   $-4 <= (R_{2f}+R_{2r})/(R_{2f}-R_{2r}) <= 0.4$ (2)
   wherein $\beta_3$ is a lateral magnification of the third lens unit in focusing on an infinity object, $\beta_4$ is a lateral magnification of the fourth lens unit in focusing on the infinity object, $R_{2f}$ is a radius of curvature of an object side surface of the negative meniscus lens, and $R_{2r}$ is a radius of curvature of an image side surface of the negative meniscus lens.

Signed and Sealed this
Twenty-ninth Day of January, 2019

Andrei Iancu
*Director of the United States Patent and Trademark Office*